(12) United States Patent
Harada et al.

(10) Patent No.: US 10,119,492 B2
(45) Date of Patent: Nov. 6, 2018

(54) FUEL INJECTION CONTROL DEVICE FOR DIRECT-INJECTION ENGINE

(71) Applicant: MAZDA MOTOR CORPORATION, Hiroshima (JP)

(72) Inventors: Yuji Harada, Higashihiroshima (JP); Tatsuya Tanaka, Higashihiroshima (JP); Hiroyuki Yamashita, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/558,474

(22) PCT Filed: Mar. 16, 2016

(86) PCT No.: PCT/JP2016/001514
§ 371 (c)(1),
(2) Date: Sep. 14, 2017

(87) PCT Pub. No.: WO2016/152103
PCT Pub. Date: Sep. 29, 2016

(65) Prior Publication Data
US 2018/0066600 A1 Mar. 8, 2018

(30) Foreign Application Priority Data
Mar. 23, 2015 (JP) .................... 2015-059856

(51) Int. Cl.
*F02D 41/40* (2006.01)
*F02D 35/02* (2006.01)
(Continued)

(52) U.S. Cl.
CPC ......... *F02D 41/403* (2013.01); *F02D 35/023* (2013.01); *F02D 35/025* (2013.01);
(Continued)

(58) Field of Classification Search
CPC .. F02D 41/403; F02D 41/1454; F02D 41/402; F02D 41/405; F02D 41/3027;
(Continued)

(56) References Cited

U.S. PATENT DOCUMENTS 8,936,007 B2 * 1/2015 Nada ................... F02D 41/403
123/299
9,546,617 B2 * 1/2017 Fujimoto ................ F02B 1/14
(Continued)

FOREIGN PATENT DOCUMENTS

JP    2000-170585 A    6/2000
JP    2009-299496 A    12/2009
(Continued)

OTHER PUBLICATIONS

International Search Report issued in PCT/JP2016/001514; dated Jun. 7, 2016.

*Primary Examiner* — Lindsay Low
*Assistant Examiner* — George Jin
(74) *Attorney, Agent, or Firm* — Studebaker & Brackett PC

(57) ABSTRACT

A fuel injection control unit (engine controller 100) performs a main injection (72) over a period ranging from a last stage of a compression stroke to an initial stage of an expansion stroke, and also performs a preceding injection (71), injecting a smaller amount of a fuel than the main injection, over a period ranging from an intake stroke to a first half of the compression stroke, and also determines whether or not the fuel injected by the preceding injection causes a partial oxidation reaction during a second half of the compression stroke, and on determining that the fuel causes the partial oxidation reaction, performs a middle-stage injection (73). The middle-stage injection is performed at such a timing that allows the fuel injected by the middle-stage injection to ignite spontaneously on or after the fuel (Continued)

injected by the main injection has spontaneously ignited and before the partial oxidation reaction occurs.

7 Claims, 11 Drawing Sheets

(51) Int. Cl.
*F02D 41/14* (2006.01)
*F02D 41/30* (2006.01)

(52) U.S. Cl.
CPC ....... *F02D 35/026* (2013.01); *F02D 41/1454* (2013.01); *F02D 41/1456* (2013.01); *F02D 41/3047* (2013.01); *F02D 41/402* (2013.01); *F02D 2200/021* (2013.01); *F02D 2200/0414* (2013.01); *Y02T 10/44* (2013.01)

(58) Field of Classification Search
CPC ............. F02D 41/3011; F02D 41/3023; F02D 41/3035; F02D 41/3041; F02D 35/025; F02D 35/023
See application file for complete search history.

(56) References Cited

U.S. PATENT DOCUMENTS

| | | | | |
|---|---|---|---|---|
| 2003/0230276 | A1* | 12/2003 | Kataoka | .................... F02B 1/12 123/295 |
| 2004/0103874 | A1* | 6/2004 | Takahashi | ............. F02D 41/403 123/299 |
| 2016/0293880 | A1 | 10/2016 | Hakii et al. | |

FOREIGN PATENT DOCUMENTS

| | | |
|---|---|---|
| JP | 2010-196525 A | 9/2010 |
| JP | 2011-089445 A | 5/2011 |
| JP | 2013-057266 A | 3/2013 |
| JP | 2013-160047 A | 8/2013 |
| JP | 2013-181519 A | 9/2013 |
| JP | 5477246 B2 | 4/2014 |
| WO | 2011/111204 A1 | 9/2011 |

* cited by examiner

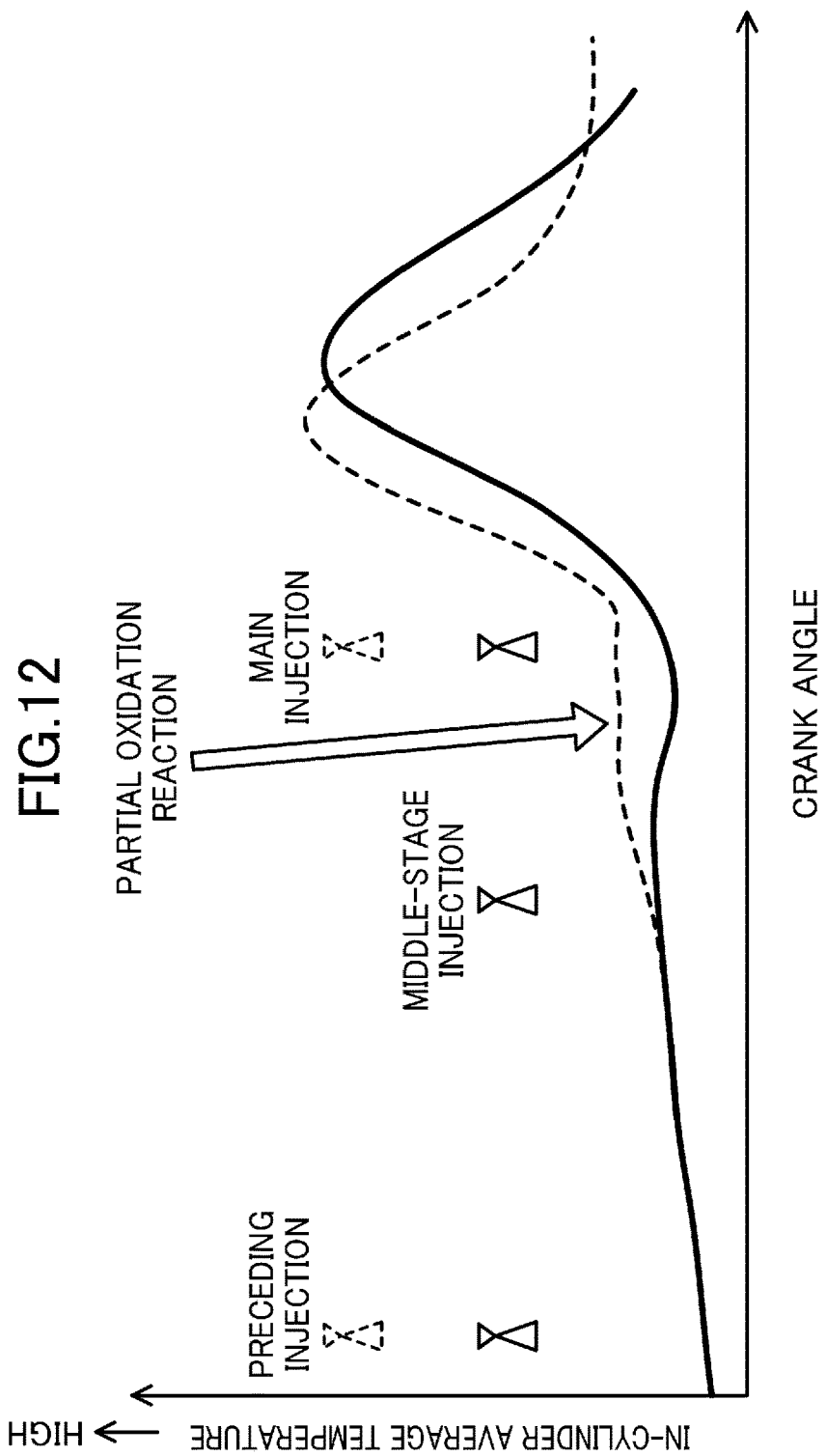

FUEL INJECTION CONTROL DEVICE FOR DIRECT-INJECTION ENGINE

TECHNICAL FIELD

The present disclosure relates to a fuel injection control device for a direct-injection engine.

BACKGROUND ART

Patent Document 1 describes that compression ignition combustion is carried out in a gasoline engine, of which the geometric compression ratio is set to be equal to or greater than 15. This engine injects, in a heavy load region where the amount of the fuel injected increases, the fuel into a cylinder twice so that the fuel is separately injected during the intake stroke and the compression stroke. The engine allows an air-fuel mixture in a cavity, provided on the top surface of a piston, to compression-ignite in the vicinity of the compression top dead center. Then, the engine allows the air-fuel mixture outside of the recess to ignite and burn, with the intense heat generated by the combustion, during the expansion stroke. This allows compression ignition combustion to be carried out, even in a heavy load region where the amount of the fuel injected increases, without increasing combustion noise.

Patent Document 2 discloses a direct-injection engine having an outwardly-opening fuel injection valve arranged on the center axis of a cylinder, and injecting the fuel in the form of a hollow cone. In this direct-injection engine, the fuel is injected into the cylinder during the second half of a compression stroke, thereby forming, in a combustion chamber, an air-fuel mixture layer and a gas layer surrounding the air-fuel mixture layer. The engine disclosed in Patent Document 2 reduces the cooling loss by making the surrounding gas layer serve as a heat-insulating layer during the combustion of the air-fuel mixture.

CITATION LIST

Patent Documents

Patent Document 1: Japanese Patent No. 5477246
Patent Document 2: Japanese Unexamined Patent Publication No. 2013-57266

SUMMARY

Technical Problem

Forming an air-fuel mixture layer and a gas layer, surrounding the air-fuel mixture layer, in the combustion chamber as disclosed in Patent Document 2 is beneficial in reducing the cooling loss. However, the heavier the load imposed on the engine being operated is, the larger the amount of the fuel injected is, and the more difficult it is to form a gas layer around the air-fuel mixture layer.

In that case, forming a fuel-lean gas layer by performing a small amount of preceding injection at an early stage ranging from the intake stroke to the first half of the compression stroke and forming an air-fuel mixture layer closer to the central region of the combustion chamber by performing a main injection at a period ranging from the last stage of the compression stroke to an initial stage of the expansion stroke as disclosed in Patent Document 1 allows the fuel-lean gas layer formed around the air-fuel mixture layer to function as a heat insulating layer and the combustion temperature around the wall surface of the combustion chamber to be lowered while the engine is operating under a heavy load. This is beneficial in cutting down the cooling loss.

However, in an environment where the pressure and temperature gradually increase in the cylinder as the piston rises during the compression stroke, the fuel injected into the cylinder during the period ranging from the intake stroke to the first half of the compression stroke (i.e., the fuel injected by the preceding injection) may cause a partial oxidation reaction. Once the fuel injected by the preceding injection has caused a partial oxidation reaction, the fuel injected into the cylinder during the period ranging from the last stage of the compression stroke to the initial stage of the expansion stroke (i.e., the fuel injected by the main injection) will ignite spontaneously after having been injected and before being well mixed with the air (i.e., without being granted a sufficient ignition time delay), thus possibly producing smoke or prolonging the combustion period during the expansion stroke so much as to cause an increase in CO emission.

In view of the foregoing background, it is therefore an object of the present disclosure to reduce a decline in exhaust emission performance by granting a sufficiently long ignition time delay to a fuel injected by a main injection to be performed over a period ranging from the last stage of the compression stroke to the initial stage of the expansion stroke in a direct-injection engine that burns the fuel through spontaneous ignition by performing discrete injections in a heavy-load region where the amount of the fuel injected increases.

Solution to the Problem

The present disclosure relates to a fuel injection control device for a direct-injection engine. The device includes: an engine body including a combustion chamber defined by a cylinder head ceiling portion, a cylinder provided for a cylinder block, and a piston reciprocating inside the cylinder; and a fuel injection control unit which includes a fuel injection valve, provided inside the combustion chamber to inject a liquid fuel, and which is configured to inject the fuel into the combustion chamber at a predetermined timing.

The fuel injection control unit performs a main injection over a period ranging from a last stage of a compression stroke to an initial stage of an expansion stroke, and also performs a preceding injection, injecting a smaller amount of the fuel than the main injection, over a period ranging from an intake stroke to a first half of the compression stroke. In addition, the fuel injection control unit determines whether or not the fuel injected by the preceding injection causes a partial oxidation reaction during a second half of the compression stroke, and on determining that the fuel causes the partial oxidation reaction, performs a middle-stage injection between the preceding injection and the main injection. The fuel injection control unit performs the middle-stage injection at such a timing that allows the fuel injected by the middle-stage injection to ignite spontaneously on or after the fuel injected by the main injection has spontaneously ignited and before the partial oxidation reaction occurs during the second half of the compression stroke.

As used herein, the "first half of the compression stroke" and "second half of the compression stroke" respectively refer to the former and latter halves when the compression stroke is evenly split into two halves, namely, a first half and a second half. Meanwhile, the "last stage of the compression stroke" refers herein to the last stage when the compression stroke is evenly divided into three stages, namely, an initial stage, a middle stage, and the last stage. Furthermore, the "initial stage of the expansion stroke" refers herein to an initial stage when the expansion stroke is evenly divided into three stages, namely, into the initial stage, a middle stage, and the last stage.

According to this configuration, the fuel injection control unit performs discrete injections including at least a preceding injection and a main injection. This is advantageous in a heavy load region where the amount of the fuel injected increases. The preceding injection is performed by injecting the fuel into the cylinder over a period ranging from the intake stroke to the first half of the compression stroke. Since the fuel is injected relatively early, the fuel injected diffuses inside the combustion chamber. In addition, the preceding injection injects a relatively small amount of the fuel, and form a relatively lean air-fuel mixture.

The main injection is performed by injecting the fuel into the cylinder over a period ranging from the last stage of the compression stroke to the initial stage of the expansion stroke. Since the fuel is injected late, the spray of the fuel is concentrated toward a central region of the combustion chamber. The main injection injects a relatively large amount of the fuel. In this manner, at a point in time when the air-fuel mixture ignites, an air-fuel mixture layer and a relatively lean gas layer, surrounding the air-fuel mixture layer, are formed in the combustion chamber. If the air-fuel mixture layer spontaneously ignites in this state, for example, then the surrounding gas layer functions as a heat insulating layer, and the combustion temperature around the wall surface of the combustion chamber falls, thus allowing the cooling loss to be reduced.

The fuel injected into the cylinder by the preceding injection is exposed to pressure and temperature that gradually rise as the compression stroke proceeds, thus causing a partial oxidation reaction in some cases during the second half of the compression stroke. As used herein, the "partial oxidation reaction" refers to a situation where the fuel falls short of causing a thermal flame reaction but causes an oxidation reaction instead. Although the quantity of heat generated by the partial oxidation reaction is smaller than in the case of a perfect oxidation reaction, the partial oxidation reaction still causes a rise in temperature inside the cylinder. Thus, once the fuel injected by the preceding injection has caused the partial oxidation reaction, the fuel injected by the main injection after that will ignite spontaneously without being granted a sufficient ignition time delay.

According to the configuration described above, the fuel injection control unit determines whether or not any partial oxidation reaction will occur, and if the answer is YES, performs a middle-stage injection between the preceding injection and the main injection. The middle-stage injection is performed before a low-temperature oxidation reaction occurs. The latent heat of vaporization of the fuel injected into the cylinder by the middle-stage injection lowers the temperature in the cylinder, thus substantially preventing the partial oxidation reaction from occurring. The middle-stage injection is suitably performed at a timing just before the partial oxidation reaction occurs. This allows the function of the middle-stage injection that lowers the temperature in the cylinder with the latent heat of vaporization to effectively prevent the occurrence of the partial oxidation reaction.

Also, if the middle-stage injection were performed too early, then the middle-stage injection could not fully perform the function of suppressing the occurrence of the partial oxidation reaction. In addition, the fuel injected by the middle-stage injection could also cause the partial oxidation reaction. Thus, the middle-stage injection is performed at such a timing that allows the fuel injected by the middle-stage injection to ignite spontaneously on or after the fuel injected by the main injection has ignited spontaneously. This substantially prevents the fuel injected by the middle-stage injection from causing the partial oxidation reaction.

In this manner, preventing the partial oxidation reaction from occurring during the second half of the compression stroke grants a sufficient ignition time delay to the fuel injected into the cylinder by the main injection, thus making it possible to avoid producing smoke or increasing the CO emission.

The fuel injection control unit may determine, based on a pressure in the cylinder, a temperature in the cylinder, and an oxygen concentration in the cylinder, whether or not the partial oxidation reaction is going to occur. A determination can be made accurately, based on these parameters, whether or not the partial oxidation reaction is going to occur. Thus, performing the middle-stage injection when the partial oxidation reaction is going to occur substantially prevents the partial oxidation reaction from occurring.

The middle-stage injection may inject a smaller amount of the fuel than the main injection does.

Since the middle-stage injection starts earlier than the main injection, the pressure and temperature in the cylinder are not sufficiently high yet at the injection timing of the middle-stage injection. Thus, as the injection amount of the middle-stage injection increases, the spray of the fuel injected into the cylinder is more and more likely to travel longer than expected, and eventually contact with the wall surface of the combustion chamber. This is disadvantageous in forming a gas layer around the air-fuel mixture layer. For that reason, the amount of the fuel injected by the middle-stage injection is suitably relatively small. In addition, decreasing the amount of the fuel injected by the middle-stage injection allows a lot of fuel to be injected by the main injection. This is beneficial in increasing the engine torque in the medium-to-heavy load region where the total amount of the fuel injected increases.

The main injection may be multi-stage injections including a plurality of fuel injections, and an interval between an end of injection of the middle-stage injection and a start of injection of the main injection may be longer than an interval between first and second injections of the main injection.

When discrete injections are performed, the spray of a fuel injected earlier may overlap with the spray of a fuel injected later, thus possibly producing an excessively dense air-fuel mixture locally. In that case, this will cause not only a rise in combustion temperature but also a decline in exhaust emission performance as well. According to the configuration described above, sufficiently widening the injection interval between the middle-stage injection and the main injection substantially prevents the spray of the fuel injected by the middle-stage injection from overlapping with the spray of the fuel injected by the main injection. This contributes advantageously to cutting down the cooling loss by lowering the combustion temperature and substantially preventing smoke from being produced by eliminating a local formation of an excessively dense air-fuel mixture.

Advantages of the Invention

As can be seen from the foregoing description, if the fuel injected by the preceding injection is going to cause a partial oxidation reaction, the fuel injection control device for the direct-injection engine performs a middle-stage injection between the preceding injection and the main injection, thus substantially preventing the partial oxidation reaction from occurring by lowering the temperature in the cylinder with the latent heat of vaporization of the fuel injected. As a result, the fuel injected by the main injection is allowed to ignite spontaneously with a sufficiently long ignition time delay granted, thus significantly reducing a decline in exhaust emission performance.

BRIEF DESCRIPTION OF THE DRAWINGS

FIG. 12 shows how the in-cylinder average temperature changes depending on whether the middle-stage injection is performed or not.

DESCRIPTION OF EMBODIMENTS

Embodiments will now be described with reference to the accompanying drawings. The following description is only an example.

(Overall Configuration of Engine)

Figure 1:
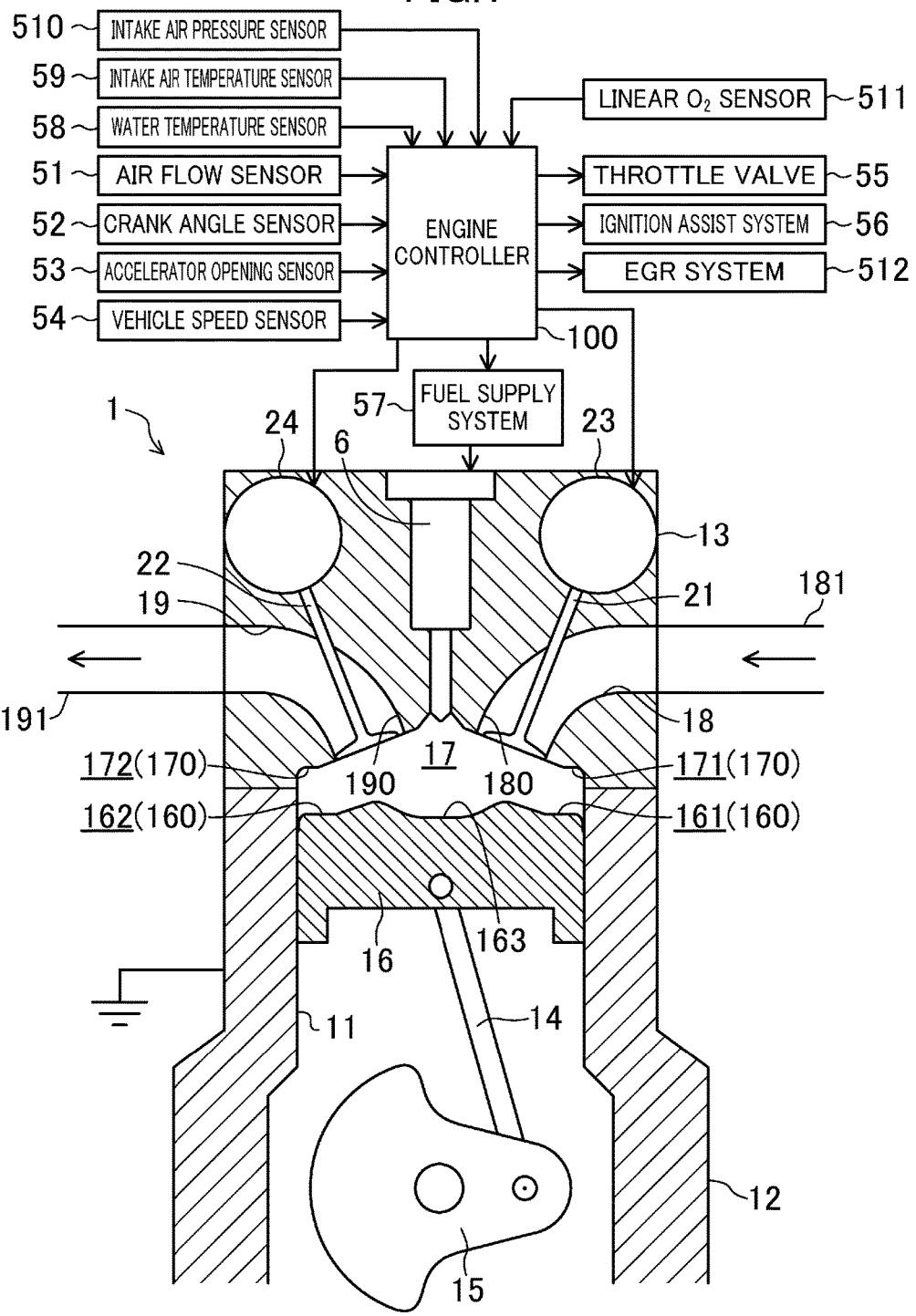
FIG. 1 schematically illustrates a configuration for a direct-injection engine.

FIG. 1 illustrates a configuration for an engine 1 according to an embodiment. Although not shown, the crankshaft 15 of the engine 1 is coupled to driving wheels via a transmission. The output of the engine 1 is transmitted to the driving wheels, thus propelling the vehicle forward. The fuel of the engine 1 is gasoline in this embodiment but may also be gasoline containing bioethanol or any other additive. The present disclosure is broadly applicable to any type of premixed combustion engine which ignites with vaporization of a fuel that has been injected and which uses any of various types of liquid fuels.

The engine 1 includes a cylinder block 12, and a cylinder head 13 mounted on the cylinder block 12. A plurality of cylinders 11 (only one of which is shown in FIG. 1) are formed inside the cylinder block 12. The engine 1 is a multi-cylinder engine. Although not shown, a water jacket, in which cooling water flows, is formed inside the cylinder block 12 and the cylinder head 13. A piston 16, which is coupled to the crankshaft 15 via a connecting rod 14, is slidably fitted into each of the cylinders 11. The piston 16 defines a combustion chamber 17 together with the cylinder 11 and the cylinder head 13.

Figure 2:
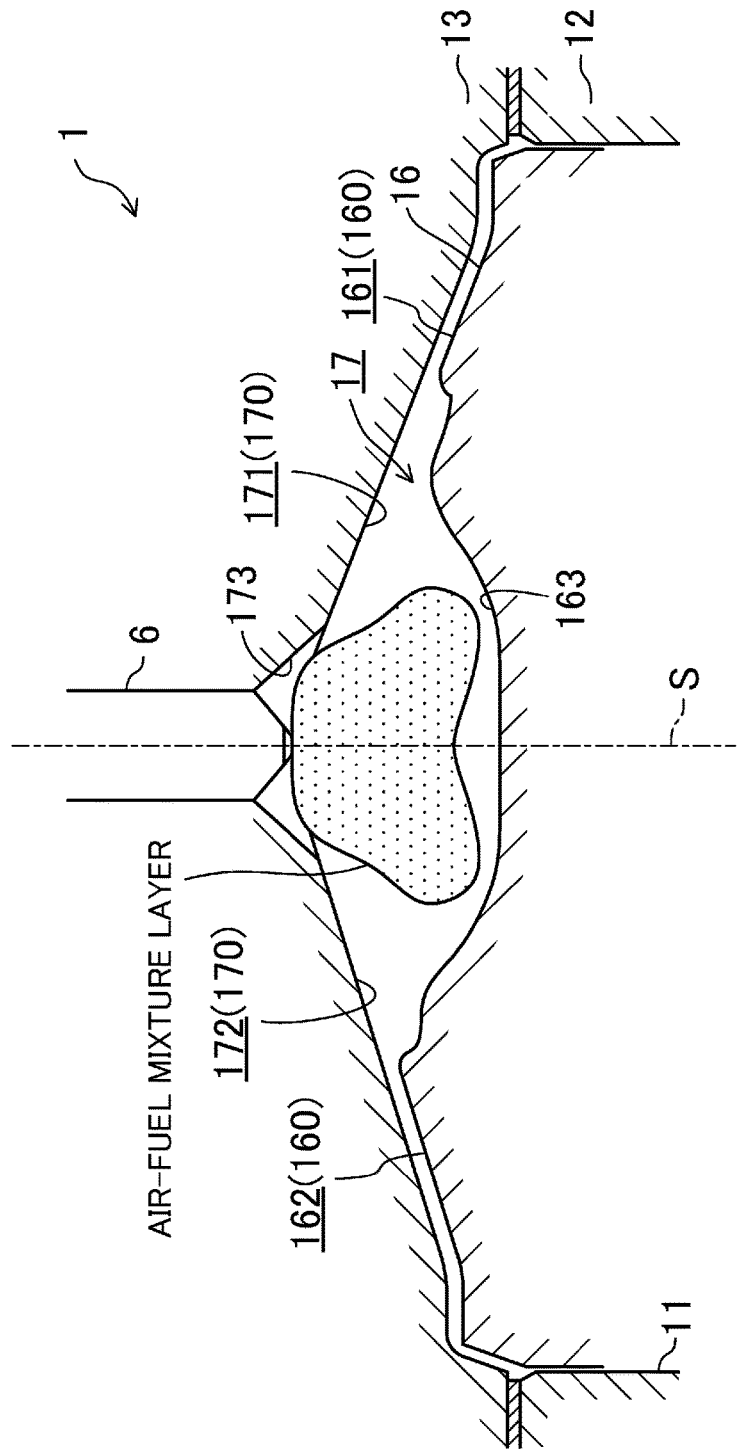
FIG. 2 is a cross-sectional view illustrating the configuration of a combustion chamber.

In this embodiment, the ceiling portion 170 of the combustion chamber 17 (i.e., the lower surface of the cylinder head 13) is configured to have an intake side slope 171 provided with an opening 180 of an intake port 18 and having an uphill gradient toward the center of the cylinder 11 and an exhaust side slope 172 provided with an opening 190 of an exhaust port 19 and having an uphill gradient toward the center of the cylinder 11. The combustion chamber 17 is of a so-called "pent roof type." The ridge of the pent roof may or may not agree with the bore center of the cylinder 11. As also shown in FIG. 2, the top surface 160 of the piston 16 is raised to form a triangular roof shape, which is defined by sloped surfaces 161, 162, each having an uphill gradient toward the center of the piston 16, on the intake and exhaust sides, respectively, so as to respectively face the intake side and exhaust side slopes 171 and 172 of the ceiling portion 170. Thus, the geometric compression ratio of the engine 1 is set to be as high as 15 or more. Also, the top surface 160 of the piston 16 has a recessed cavity 163.

Although only one intake port 18 is shown in FIG. 1, two intake ports 18 are actually provided for the cylinder head 13 of each cylinder 11. The respective openings 180 of the two intake ports 18 are arranged side by side in the direction of the engine's output shaft (i.e., the crankshaft 15) on the intake side slope 171 of the cylinder head 13. The intake ports 18 communicate with the combustion chamber 17 through these openings 180. Likewise, two exhaust ports 19 are provided for the cylinder head 13 of each cylinder 11. The respective openings 190 of the two exhaust ports 19 are arranged side by side in the direction of the engine's output shaft on the exhaust side slope 172 of the cylinder head 13. The exhaust ports 19 communicate with the combustion chamber 17 through these openings 190.

Each of the intake ports 18 is connected to an associated intake passage 181. A throttle valve 55 for controlling the intake flow rate is provided halfway through the intake passage 181. Each of the exhaust ports 19 is connected to an associated exhaust passage 191. An exhaust gas purification system with one or more catalyst converters is arranged on the exhaust passage 191. Each of the catalyst converters may include a three way catalyst. However, the catalyst converter does not have to be a three way catalyst.

The cylinder head 13 is provided with an intake valve 21 arranged so as to be capable of shutting off the intake ports 18 from the combustion chamber 17 (i.e., closing the combustion chamber 17). The intake valve 21 is driven by an intake valve drive mechanism. The cylinder head 13 is also provided with an exhaust valve 22 arranged so as to be capable of shutting off the exhaust ports 19 from the combustion chamber 17. The exhaust valve 22 is driven by an exhaust valve drive mechanism. The intake valve 21 and the exhaust valve 22 reciprocate at a predetermined timing to open and close the intake port 18 and the exhaust port 19, respectively, thereby exchanging the gases in the cylinder 11.

Although not shown, the intake valve drive mechanism includes an intake camshaft which is drive-coupled to the crankshaft 15. The intake camshaft rotates in synchronization with the rotation of the crankshaft 15. Although not shown, the exhaust valve drive mechanism includes an exhaust camshaft which is drive-coupled to the crankshaft 15. The exhaust camshaft rotates in synchronization with the rotation of the crankshaft 15.

In this example, the intake valve drive mechanism includes at least a hydraulic or electric variable valve timing (VVT) mechanism 23 capable of continuously changing the phase of the intake camshaft within a predetermined angle range. The intake valve drive mechanism may further include a variable valve lift mechanism capable of changing the valve lift amount as well as the VVT mechanism 23.

In this example, the exhaust valve drive mechanism includes at least a hydraulic or electric VVT mechanism 24 capable of continuously changing the phase of the exhaust camshaft within a predetermined angle range. The exhaust valve drive mechanism may further include a variable valve lift mechanism capable of changing the valve lift amount as well as the VVT mechanism 24.

The variable valve lift mechanism may also be a continuous variable valve lift (CVVL) mechanism capable of continuously changing the valve lift amount. Note that the valve drive mechanisms for driving the intake valve 21 and the exhaust valve 22 may also be any other types of drive mechanisms, which may be hydraulic or electromagnetic drive mechanisms, for example.

As shown in FIG. 2 on a larger scale, a fuel injection valve 6 for directly injecting the fuel into the combustion chamber 17 is attached to the cylinder head 13. The fuel injection valve 6 is arranged on the pent roof ridge on which the intake side slope 171 and the exhaust side slope 172 intersect with each other. The fuel injection valve 6 is also arranged such that its injection axis S is aligned with the axis of the cylinder 11 and the tip end of its injection orifice faces the inside of the combustion chamber 17. Note that the injection axis S of the fuel injection valve 6 may be aligned or misaligned with the axis of the cylinder 11.

The cavity 163 of the piston 16 is arranged to face to the fuel injection valve 6. The fuel injection valve 6 injects the fuel into the cavity 163.

In this example, the fuel injection valve 6 is an outwardly-opening fuel injection valve. The outwardly-opening fuel injection valve 6 has a nozzle body 60 with a nozzle orifice 61 through which the fuel is injected, and an outwardly-opening valve 62 which opens and closes the nozzle orifice 61, as shown in FIG. 3 illustrating its tip end on a larger scale.

The nozzle body 60 is formed as a tubular member such that the fuel flows through the inside of the nozzle body 60. The nozzle orifice 61 is provided at the tip end of the nozzle body 60. The nozzle orifice 61 is tapered such that the diameter gradually increases toward the tip.

The outwardly-opening valve 62 has a valve body 63, exposed to the outside of the nozzle body 60 at the tip of the nozzle body 60, and a connecting portion 64 extending from the valve body 63, passing through the nozzle body 60, and connected to a piezoelectric element (not shown). The valve body 63 includes a seating portion 65 having substantially the same shape as the tapered nozzle orifice 61. There is a decreased diameter portion 66 between the seating portion 65 and connecting portion 64 of the valve body 63. As shown in FIG. 3, the decreased diameter portion 66 has a different inclination from the seating portion 65. Specifically, the decreased diameter portion 66 inclines from the base end toward the tip end more gently than the seating portion 65.

Figure 3:
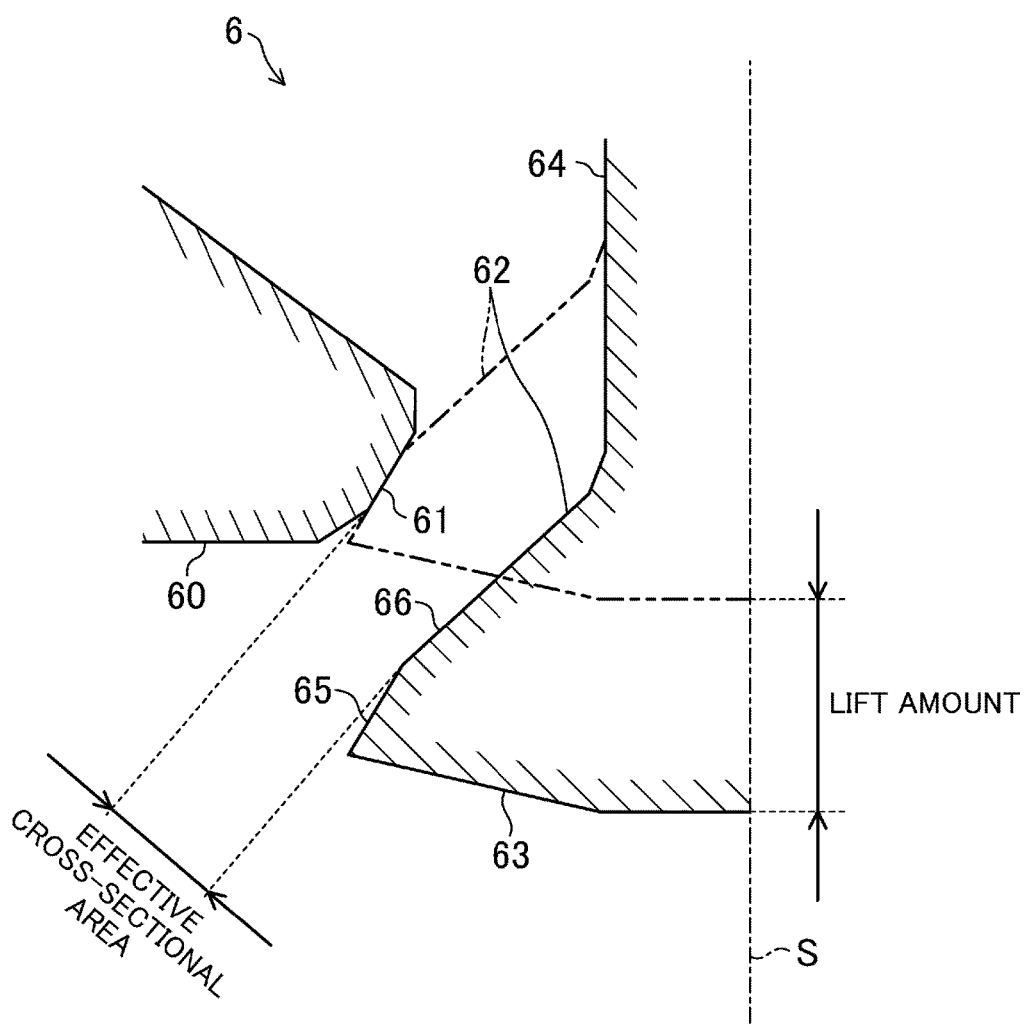
FIG. 3 illustrates how the effective cross-sectional area of the nozzle orifice of an outwardly-opening fuel injection valve changes with a lift amount.

As indicated by the two-dot chain in FIG. 3, while the seating portion 65 abuts on the nozzle orifice 61, the nozzle orifice 61 is closed. The piezoelectric element is deformed upon the application of a voltage thereto, thus outwardly lifting the outwardly-opening valve 62 along the injection axis S. Consequently, as indicated by the solid line in FIG. 3, the seating portion 65 moves away from the nozzle orifice 61, thus making the nozzle orifice 61 open. When the nozzle orifice 61 is opened, the fuel is injected through the nozzle orifice 61 in a direction inclined with respect to the injection axis S and spreading radially outward from the injection axis S. Specifically, the fuel is injected in the form of a hollow cone, of which the center axis is defined by the injection axis S. When the application of the voltage to the piezoelectric element stops, the piezoelectric element recovers its original shape, thus having the seating portion 65 of the outwardly-opening valve 62 abut on the nozzle orifice 61 and close the nozzle orifice 61 again.

As the voltage applied to the piezoelectric element increases, the lift amount of the outwardly-opening valve 62 from the state closing the nozzle orifice 61 increases. As is clear from FIG. 3, the larger the lift amount is, the greater the degree of opening (i.e., the effective cross-sectional area) of the nozzle orifice 61 becomes. In this case, the effective cross-sectional area is defined by the distance from the nozzle orifice 61 to the seating portion 65. As the lift amount increases, so does the size of the particles of the spray of the fuel injected through the nozzle orifice 61 into the combustion chamber 17. Conversely, as the lift amount decreases, so does the size of the particles of the spray of the fuel injected through the nozzle orifice 61 into the combustion chamber 17. Also, while passing through the nozzle orifice 61, the fuel flows along the decreased diameter portion 66. As the lift amount increases, the decreased diameter portion 66 becomes more distant from the nozzle orifice 61, and therefore, the spray angle of the fuel (i.e., the taper angle of the hollow cone) becomes narrower. Meanwhile, as the lift amount decreases, the decreased diameter portion 66 comes closer to the nozzle orifice 61, and therefore, the spray angle of the fuel (i.e., the taper angle of the hollow cone) becomes wider.

Also, supposing the fuel pressure is constant, the larger the effective cross-sectional area is, the lower the injection rate reached becomes. Conversely, as the effective cross-sectional area decreases, the injection rate increases. However, if the effective cross-sectional area becomes too small, then the effect of the frictional resistance caused by the wall surface of the injection orifice on the fuel becomes so significant that the injection rate reached becomes low. Thus, there is a lift amount at which the fuel injection rate becomes maximum. The fuel injection rate declines, no matter whether the lift amount is larger or smaller than the maximum rate lift amount. Note that this maximum rate lift amount is relatively small.

As shown in FIG. 2, the ceiling portion 170 of the cylinder head 13 has a recess 173, which is recessed from the ceiling surface, and the tip end of the fuel injection valve 6 is housed in the recess 173. The inner surface of the recess 173 is sloped such that its diameter gradually increases toward the inside of the combustion chamber 17. Arranging the tip end of the fuel injection valve 6 at a position deeper than the ceiling surface of the cylinder head 13 can make the gap between the top surface 160 of the piston 16 and the tip end of the fuel injection valve 6 as wide as possible when the piston 16 reaches the top dead center, while increasing the geometric compression ratio. This is beneficial in forming the heat-insulating gas layer around the air-fuel mixture layer as will be described later. In addition, the gap between the tip end of the fuel injection valve 6 and the inner surface of the recess 173 widens so much as to substantially prevent the spray of the fuel injected from the fuel injection valve 6 from being deposited on the ceiling surface of the cylinder head 13 due to the Coanda effect.

A fuel supply system 57 includes an electrical circuit for driving the outwardly-opening valve 62, and a fuel supply system supplying the fuel to the fuel injection valve 6. The engine controller 100 outputs an injection signal with a voltage corresponding to the lift amount to the electrical circuit at predetermined timing, thereby operating, via the electrical circuit, the outwardly-opening valve 62 so that a desired amount of the fuel is injected into the cylinder. When the injection signal is not output (i.e., when the injection signal has a voltage of zero), the nozzle orifice 61 is closed by the outwardly-opening valve 62. In this manner, the operation of the piezoelectric element is controlled by the injection signal from the engine controller 100. The engine controller 100 controls the operation of the piezoelectric element, thereby controlling the injection of the fuel through the nozzle orifice 61 of the fuel injection valve 6 and the lift amount at the time of the fuel injection. Since the piezoelectric element is highly responsive, multi-stage injections can be performed, e.g., about twenty injections can be performed in 1-2 msec. However, the means for operating the outwardly-opening valve 62 is not limited to a piezoelectric element.

Although not shown, the fuel supply system is provided with a high-pressure fuel pump and a common rail. The high-pressure fuel pump pressure-feeds the fuel, supplied from a fuel tank through a low-pressure fuel pump, to the common rail, which stores the pressure-fed fuel at a predetermined fuel pressure. Then, the fuel injection valve 6 is operated (i.e., the outwardly-opening valve 62 is lifted) to inject the fuel stored in the common rail through the nozzle orifice 61. A fuel injection control unit is comprised of the engine controller 100 and the fuel injection valve 6.

As will be described in detail later, the fuel injection control unit is configured such that a (combustible) air-fuel mixture layer and a heat-insulating gas layer, surrounding the air-fuel mixture layer, can be formed in the combustion chamber 17 (i.e., inside the cavity 163) as schematically shown in FIG. 2.

This engine 1 is configured to burn, basically in the entire operation range, the air-fuel mixture formed in the cylinder 11 by compression ignition (i.e., by controlled auto ignition (CAI)). The engine 1 includes an ignition assist system 56 for assisting the air-fuel mixture with ignition under a predetermined environment. The ignition assist system 56 may be a discharge plug arranged to face the combustion chamber 17, for example. That is to say, applying controlled pulses of a high voltage to the electrode of the discharge plug to generate an extremely short pulse discharge in the combustion chamber 17 allows a streamer discharge to be generated in the combustion chamber, thus producing ozone in the cylinder. The ozone assists the CAI. Note that the ignition assist system does not have to be implemented as a discharge plug for producing ozone but may also be a spark plug for assisting the CAI by applying energy to the air-fuel mixture through a spark discharge.

The engine 1 further includes an EGR system 512 configured to introduce a burned gas again into the cylinder 11. The EGR system 512 includes both an external EGR system for reintroducing the burned gas into the cylinder 11 through an EGR passage that connects together the exhaust and intake passages 191 and 181 of the engine 1 and an internal EGR system for allowing part of the burned gas in the cylinder 11 to substantially stay in the cylinder 11.

The engine controller 100 is a controller including a known microcomputer as a base element. The engine controller 100 includes a central processing unit (CPU) that executes programs, a memory configured, for example, as a RAM and a ROM and storing programs and data, and an input and output (I/O) bus inputting and outputting electrical signals.

The engine controller 100 receives at least a signal indicating the flow rate of intake air from an air flow sensor 51, a crank angle pulse signal from a crank angle sensor 52, an accelerator opening signal from an accelerator opening sensor 53 which detects the degree of depression of the accelerator pedal, a vehicle speed signal from a vehicle speed sensor 54, the engine's 1 cooling water temperature signal from a water temperature sensor 58, an intake temperature signal from an intake temperature sensor 59, an intake pressure signal from an intake pressure sensor 510, and an in-exhaust-gas oxygen concentration signal from a linear $O_2$ sensor 511. Based on these input signals, the engine controller 100 calculates parameters for controlling the engine 1, such as desired throttle opening signal, fuel injection pulse, ignition assist signal, and valve phase angle signal. Then, the engine controller 100 outputs these signals to the throttle valve 55 (more accurately, a throttle actuator which operates the throttle valve 55), the VVT mechanisms 23, 24, the fuel supply system 57, the ignition assist system 56, the EGR system 510, and so on.

The geometric compression ratio ε of the engine 1 is set to be equal to or greater than 15, as described above. The geometric compression ratio may be equal to or less than 40, and is suitably in the range of 20 to 35. The engine 1 is configured to have an expansion ratio that increases as the compression ratio rises. Thus, the engine 1 has a high compression ratio and a relatively high expansion ratio at the same time. A high geometric compression ratio stabilizes the CAI combustion.

The combustion chamber 17 is defined by the inner wall surface of the cylinder 11, the top surface 160 of the piston 16, the lower surface (i.e., the ceiling portion 170) of the cylinder head 13, and the respective valve head surfaces of the intake valve 21 and exhaust valve 22. Heat shield layers are respectively provided at the above-mentioned surfaces to reduce the cooling loss. This insulates the combustion chamber 17 from heat. The heat shield layers may be provided on all or part of these defining surfaces. Moreover, the heat shield layer may also be provided on the wall surfaces of the intake ports 18 and the exhaust ports 19 near the openings at the ceiling portion 170 of the combustion chamber 17, although such wall surfaces are not the wall surfaces directly defining the combustion chamber 17.

These heat shield layers are designed to have lower thermal conductivity than the base metal member forming the combustion chamber 17 to prevent the heat of the combustion gas in the combustion chamber 17 from being dissipated through the defining surfaces.

The heat shield layers suitably have lower volumetric specific heat than the base members to reduce the cooling loss. That is to say, it is therefore beneficial to reduce the heat capacity of the heat shield layers so that the temperature of the surfaces defining the combustion chamber 17 varies in accordance with the change of the gas temperature in the combustion chamber 17.

The heat shield layers may be formed by coating a base member with a ceramic material, such as $ZrO_2$, by plasma spray coating. The ceramic material may have a large number of pores. This allows for further reducing the thermal conductivity and volumetric specific heat of the heat shield layers.

According to this embodiment, not only adopting the heat shield structure for the combustion chamber but also forming a heat-insulating gas layer in the combustion chamber 17 while the engine 1 is warm (i.e., has a temperature equal to or greater than a predetermined temperature) reduce the cooling loss significantly.

Specifically, injecting the fuel through the tip end of the injection nozzle of the fuel injection valve 6 into the cavity 163 on or after the compression stroke such that a heat-insulating gas layer including fresh air is formed in an outer peripheral region inside the combustion chamber 17 and that an air-fuel mixture layer is formed in the central region thereof allows for forming a layered structure in which the air-fuel mixture layer is formed in the central region inside the cavity 163 in the vicinity of the fuel injection valve 6 and a heat-insulating gas layer, including fresh air, is formed to surround the air-fuel mixture layer as shown in FIG. 2. As used herein, the air-fuel mixture layer may be defined as a layer comprised of a combustible air-fuel mixture, which may be an air-fuel mixture with a fuel-air equivalence ratio φ of 0.1 or more, for example. The longer the time that has passed since the start of injection of a fuel is, the larger the degree of diffusion of the spray of the fuel is. Thus, the size of the air-fuel mixture layer is the size measured at the time of ignition. A fuel may be regarded as having ignited when the combustion mass ratio of the fuel becomes equal to or greater than 1%, for example. The air-fuel mixture ignites in the vicinity of the compression top dead center.

The heat-insulating gas layer may consist essentially of fresh air or may additionally include a burned gas (i.e., an EGR gas) as well as fresh air. There is no problem even if the heat-insulating gas layer includes a small percentage of the fuel. Rather, the heat-insulating gas layer needs to be more fuel-lean than the air-fuel mixture layer is so as to function as a heat insulating layer. As will be described later, when the load on the engine 1 increases to cause an increase in the amount of the fuel injected, the heat-insulating gas layer will be a layer including a small amount of the fuel but will still be more fuel-lean than the air-fuel mixture layer is.

When the air-fuel mixture produces CAI combustion in a state where a heat-insulating gas layer and an air-fuel mixture layer have been formed as shown in FIG. 2, the heat-insulating gas layer, interposed between the air-fuel mixture layer and the wall surface of the combustion chamber 17, not only substantially prevents the flame of the air-fuel mixture layer from contacting with the wall surface of the combustion chamber 17 but also functions as a heat insulating layer to substantially prevent heat from being transferred from inside the combustion chamber 17 onto the wall surface of the combustion chamber 17.

Note that just cutting down the cooling loss may allow the decrease in the cooling loss to be converted into exhaust loss, which does not greatly contribute to improving the indicated thermal efficiency. However, this engine 1 efficiently converts the energy of the combustion gas, corresponding to the decrease in the cooling loss, into mechanical work by increasing the expansion ratio involved with the increase in compression ratio. That is to say, it can be said that the engine 1 significantly improves the indicated thermal efficiency by adopting a configuration for reducing both the cooling loss and the exhaust loss.

To form such an air-fuel mixture layer and such a heat-insulating gas layer in the combustion chamber 17, the gas flow inside the combustion chamber 17 is suitably weak at the timing of injecting the fuel. For that purpose, the intake ports are configured to have a straight shape that either prevents, or substantially reduces, the production of a swirl inside the combustion chamber 17 and to make the tumble flow as weak as possible.

(Details of Fuel Injection Control)

Figure 4:
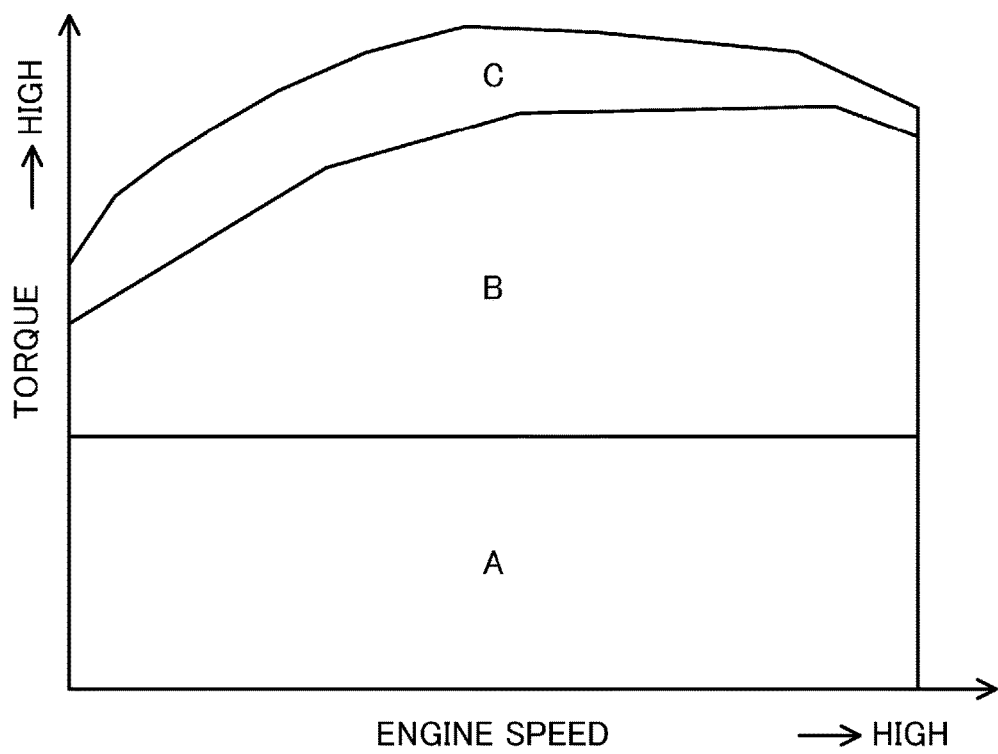
FIG. 4 illustrates an exemplary operation map while an engine is warm.

FIG. 4 illustrates an exemplary operation map of the engine 1. This operation map is divided, in the load direction, into a light-to-medium load region A, a medium-to-heavy load region B, and a full-load region C. The light-to-medium load region A, medium-to-heavy load region B, and full-load region C are mainly different in the fuel injection mode.

The light-to-medium load region A is a region in which the load on the engine 1 is the lightest. Since the load is the lightest, the amount of the fuel injected becomes the smallest. In this light-to-medium load region A, CAI combustion is carried out with an air-fuel mixture layer and a heat-insulating gas layer, including substantially no fuel, formed in the combustion chamber 17 as described above. Although not shown, the fuel injection valve 6 injects the fuel into the cylinder 11 during the second half of the compression stroke. The fuel may be injected either only once or multiple times. Injecting the fuel during the compression stroke period in which the pressure and temperature in the cylinder 11 become high substantially prevents the spray of the fuel injected from traveling longer than expected. Thus, an air-fuel mixture layer can be formed in the central region of the combustion chamber 17 and a heat-insulating gas layer can be formed around the air-fuel mixture layer. The air-fuel mixture layer ignites spontaneously in the vicinity of the compression top dead center. Note that in this light-to-medium load region A, part of the burned gas is introduced into the cylinder 11 by the EGR system 512.

The full-load region C is a region in which the load on the engine 1 is the heaviest. Since the load is the heaviest, the amount of the fuel injected becomes the largest. Allowing the fuel to ignite spontaneously in the full-load region C would allow the pressure to rise so steeply during the combustion as to increase the level of combustion noise. Thus, in this full-load region C, the ignition timing is retarded until a predetermined time during the expansion stroke, thereby making the combustion period overlap with a point in time when the pressure rise rate during motoring reaches the negative maximum value. This reduces the pressure rise rate during the combustion and lowers the combustion noise level.

However, as the expansion stroke proceeds, the temperature in the cylinder 11 falls. Thus, retarding the ignition timing too much could cause an accidental fire. In particular, this engine 1 has so high a geometric compression ratio that the temperature in the cylinder 11 falls rapidly during the expansion stroke. Therefore, it is difficult to retard the ignition timing to the point that the combustion noise level can be reduced sufficiently.

Figure 5:
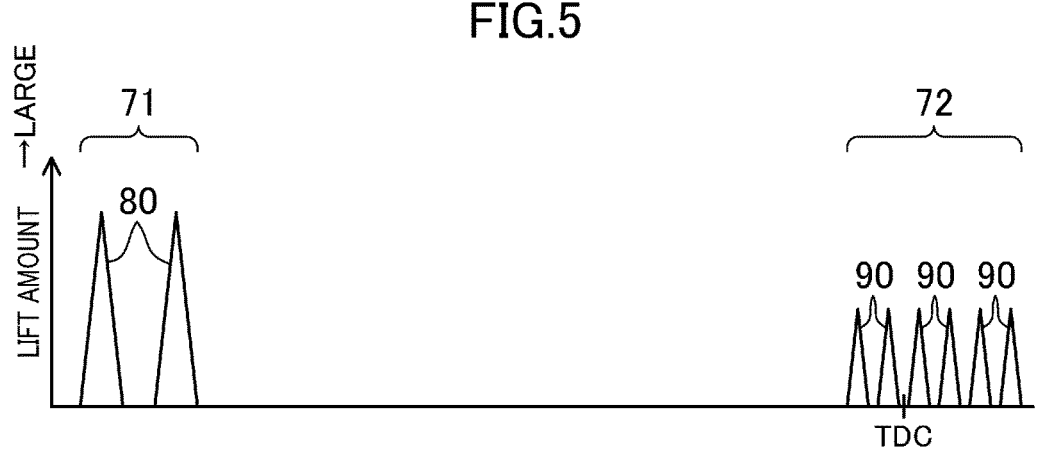
FIG. 5 shows a fuel injection mode in a full-load region.

Thus, in the full-load region C, this engine 1 performs two fuel injections, namely, a preceding injection 71 and a main injection 72 after the preceding injection 71, i.e., performs discrete injections, as shown in FIG. 5. Having the fuel injected into the cylinder 11 by the preceding injection 71 cause a partial oxidation reaction allows for maintaining a constant temperature in the cylinder 11 even on or after the compression top dead center, thus making the fuel injected by the main injection 72 ignite spontaneously on or after the compression top dead center. The preceding injection 71 is performed to increase the in-cylinder temperature, while the main injection 72 is performed to produce spontaneous ignition and combustion during the expansion stroke.

Figure 6:
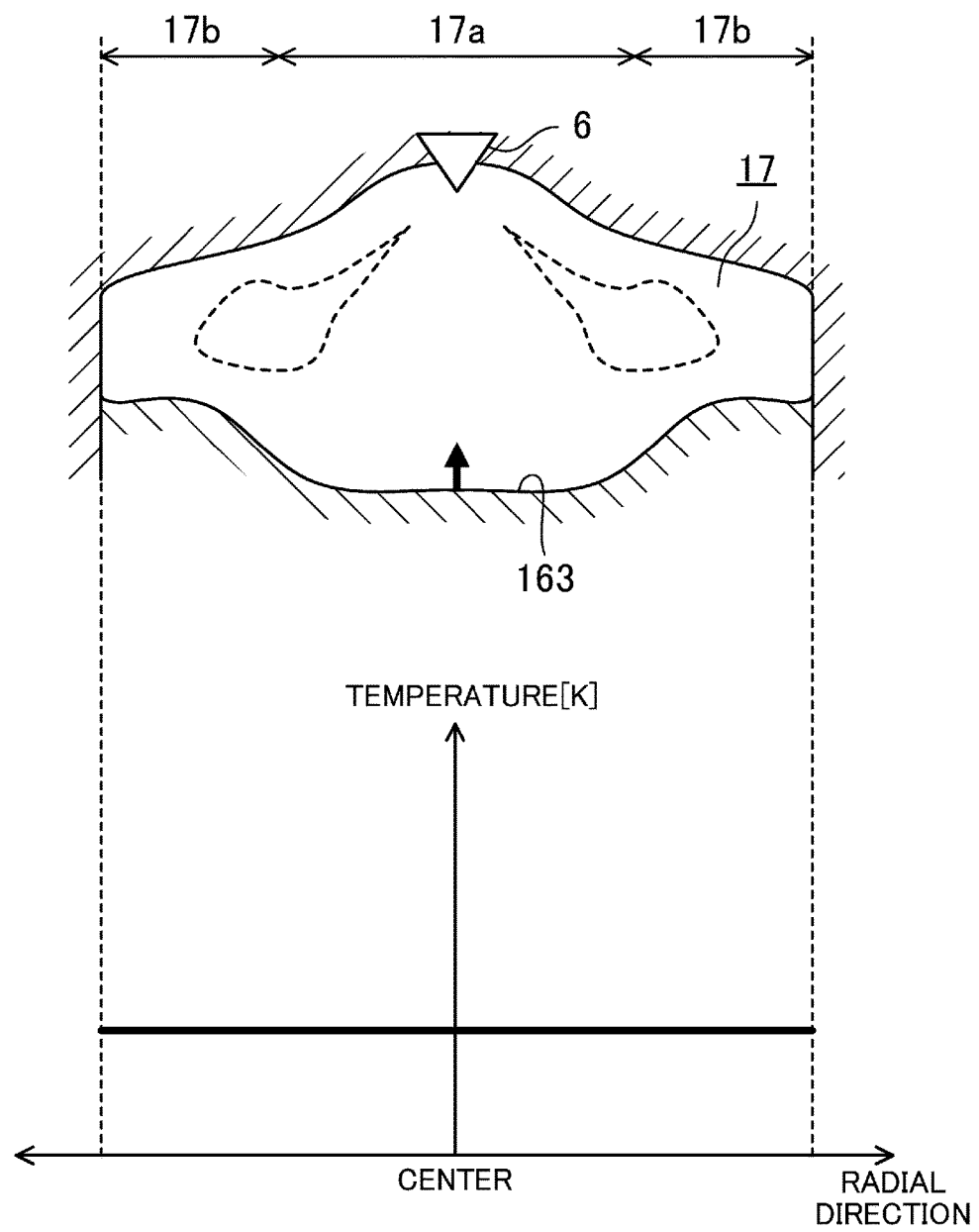
FIG. 6 The top drawing of FIG. 6 schematically illustrates sprays of a fuel formed in a combustion chamber when a preceding injection is performed in the full-load region, and the bottom graph of FIG. 6 shows the distribution of temperatures in the combustion chamber in such a situation.
Figure 7:
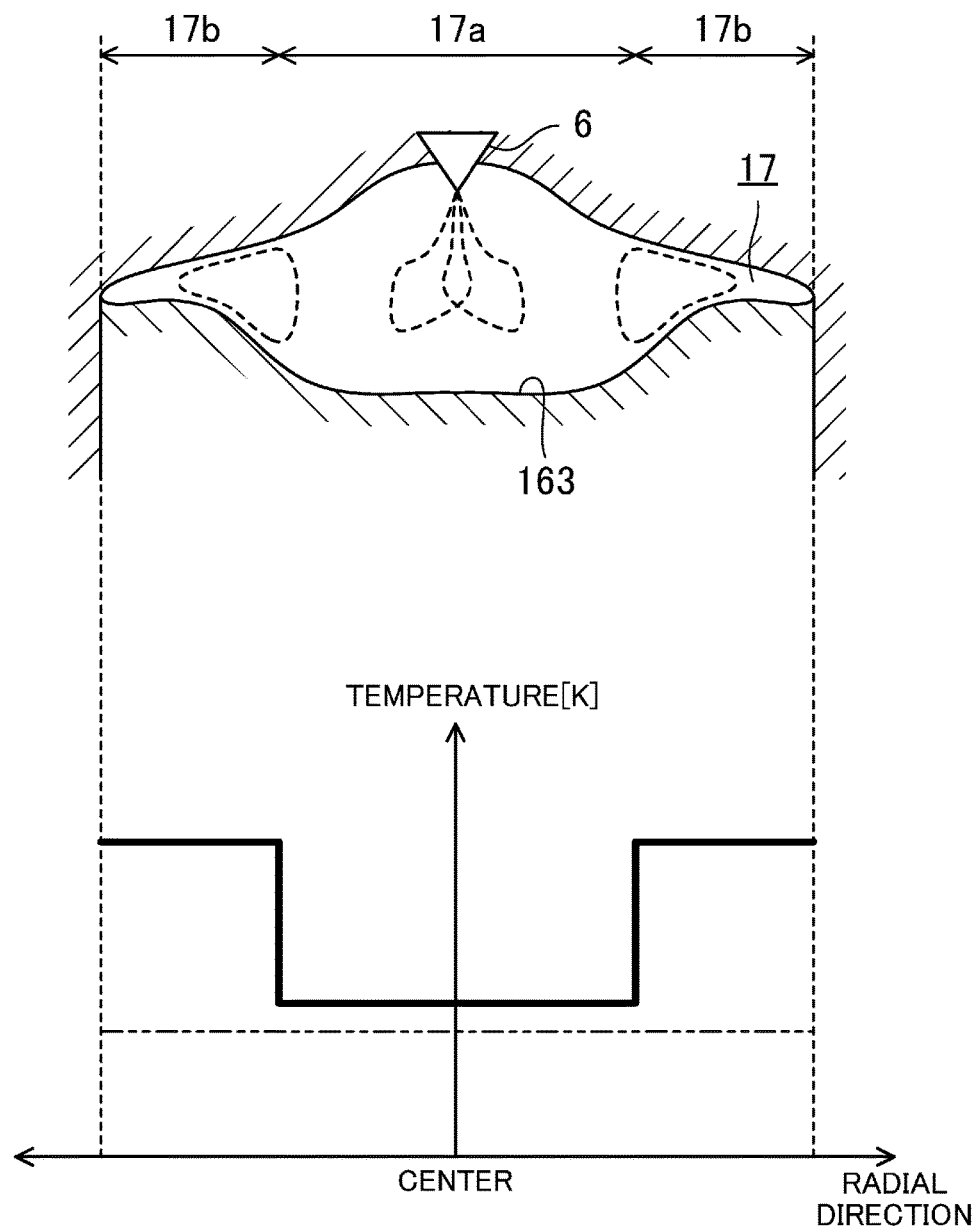
FIG. 7 The top drawing of FIG. 7 schematically illustrates sprays of the fuel formed in the combustion chamber at a compression top dead center in the full-load region, and the bottom graph of FIG. 7 shows the distribution of temperatures in the combustion chamber in such a situation.
Figure 8:
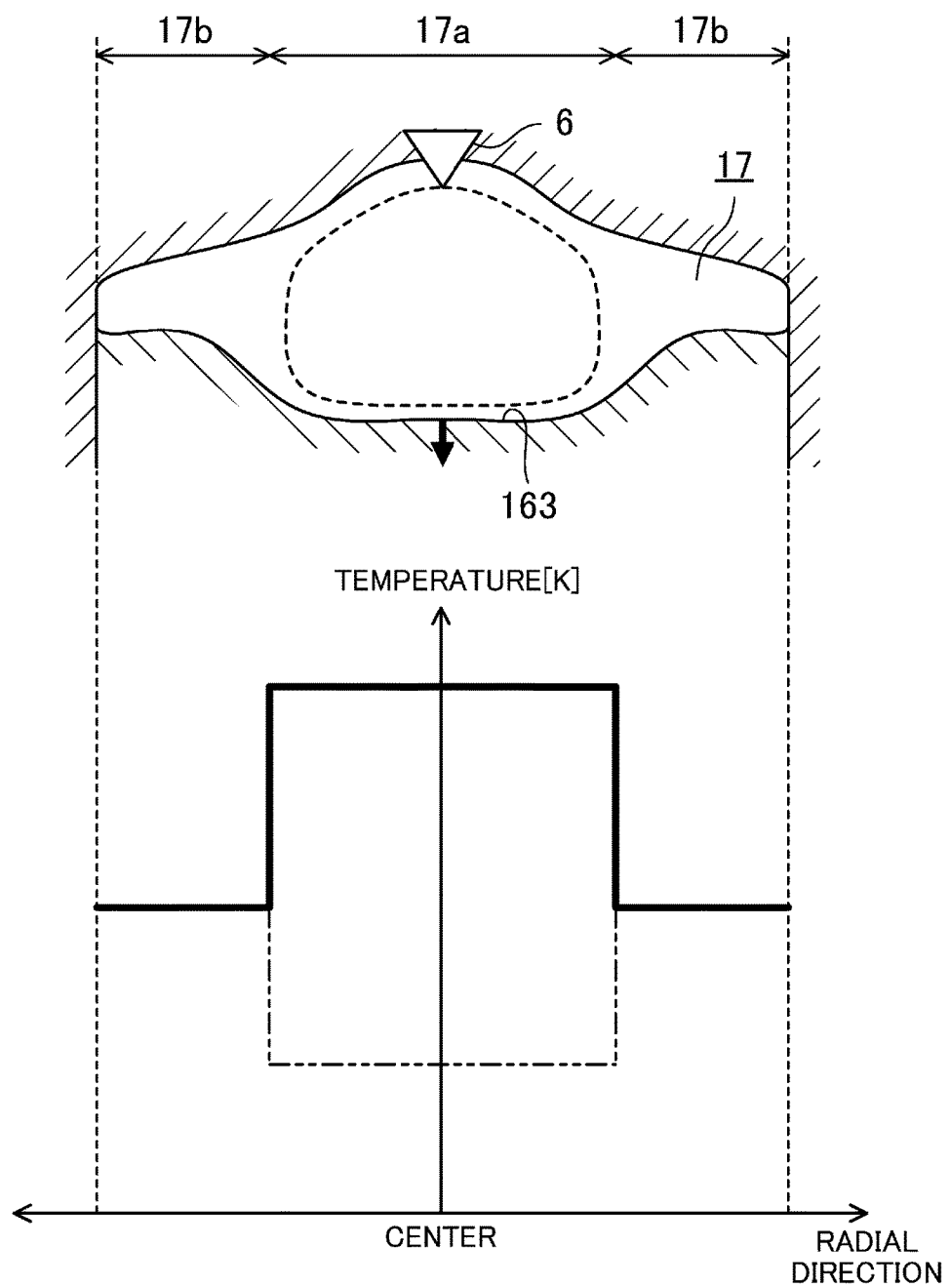
FIG. 8 The top drawing of FIG. 8 schematically illustrates a spray of the fuel formed in the combustion chamber when a main injection is finished in the full-load region, and the bottom graph of FIG. 8 shows the distribution of temperatures in the combustion chamber in such a situation.

FIG. 5 shows a fuel injection mode in the full-load region C. The top drawing of FIG. 6 schematically illustrates sprays of a fuel formed in the combustion chamber 17 when the preceding injection 71 is performed in the full-load region C, and the bottom graph of FIG. 6 shows the distribution of temperatures in the combustion chamber 17 in such a situation. The top drawing of FIG. 7 schematically illustrates sprays of the fuel formed in the combustion chamber 17 at the compression top dead center in the full-load region C, and the bottom graph of FIG. 7 shows the distribution of temperatures in the combustion chamber 17 in such a situation. The top drawing of FIG. 8 schematically illustrates a spray of the fuel formed in the combustion chamber 17 when the main injection 72 is finished in the full-load region, and the bottom graph of FIG. 8 shows the distribution of temperatures in the combustion chamber 17 when a main combustion is produced.

In the full-load region C, the engine controller 100 stops the reflux of the EGR gas. The engine controller 100 stops the reflux of the EGR gas, because the required load is so heavy in the full-load region C that a volume of air corresponding to the heavy load is required.

Also, the engine controller 100 performs control such that the excess air factor λ becomes equal to or less than one in the full-load region C. The fuel injection mode in the full-load region will be described in detail.

The preceding injection 71 is performed before the middle stage of the compression stroke. More specifically, the preceding injection 71 is performed after the intake valve 21 of the engine 1 has been closed during the compression stroke. For example, the preceding injection 71 may be performed at such a timing that allows the fuel injection to end at 120-90 degrees before the compression top dead center.

The preceding injection 71 is comprised of a predetermined number of (e.g., two in the example illustrated in FIG. 5) fuel injections 80, 80 in which the lift amount of the fuel injection valve 6 is set to be larger than that of the main injection 72 and the fuel injection interval is set to be longer than that of the main injection 72. Since the lift amount has been increased, the spray of the fuel injected by the preceding injection 71 has a larger particle size and a greater momentum.

In addition, the longer interval between the injections decreases the negative pressure in the vicinity of the injection axis S of the fuel injection valve 6. The spray flow, formed in the combustion chamber 17 by the injection of the fuel through the fuel injection valve 6, comes to trap the surrounding air (or a gas including the air). However, it is difficult for the air to enter the spray of the fuel injected in a hollow cone shape through the tip end of the fuel injection valve 6. When the interval between the injections is narrow, the recovery of the negative pressure in the vicinity of the injection axis S is slowed down, and therefore, the negative pressure increases. On the other hand, when the interval between the injections is wide, the recovery of the negative pressure in the vicinity of the injection axis S is accelerated, and therefore, the negative pressure decreases.

The spray of the fuel injected by the preceding injection 71 has a larger particle size, a greater momentum, and a lower negative pressure. Thus, the spray will not be attracted toward the negative pressure easily. As a result, as illustrated in the top drawing of FIG. 6, the spray of the fuel widely spreads radially outward with respect to the injection axis S of the fuel injection valve 6 as its center axis and travels over a relatively long distance. At a point in time when the spray of the fuel injected by the preceding injection 71 causes a partial oxidation reaction, the spray of the fuel has reached a radially (i.e., in the radial direction of the cylinder 11) peripheral region 17b of the combustion chamber 17. As used herein, the "radially peripheral region of a cylinder" refers to the outer region when the cylinder is radially split into two regions at a half of the maximum diameter as shown in FIG. 6, for example. On the other hand, the "radially central region of the cylinder" refers herein to the inner region when the cylinder is radially split into the two regions at a half of the maximum diameter. In other words, the preceding injection 71 is performed at such a timing that allows the spray of the fuel to have reached the radially peripheral region 17b when the spray causes an oxidation reaction. As a result, at a point in time when the spray of the fuel injected by the preceding injection 71 causes an oxidation reaction, the concentration of the fuel in the radially peripheral region 17b of the combustion chamber 17 becomes higher than that of the fuel in the radially central region 17a thereof.

In this case, the preceding injection 71 is performed after the intake valve 21 has been closed as described above. Thus, the flow of the intake air has already settled to a certain degree, and therefore, the spray of the fuel that has reached the radially peripheral region 17b of the combustion chamber 17 tends to stay there.

The amount of the fuel injected by the preceding injection 71 is set to be an amount defined by such an air-fuel ratio at which the fuel causes a partial oxidation reaction. The air-fuel ratio at which the fuel causes a partial oxidation reaction may be an air-fuel ratio at which the excess air factor λ becomes equal to or greater than 8. Setting the excess air factor λ to be equal to or greater than 8 reduces the reaction of allowing CO in the fuel to turn into $CO_2$. That is to say, the fuel does cause an oxidation reaction, but falls short of causing a thermal flame reaction.

Meanwhile, the main injection 72 may be performed so as to be started at a timing before the compression top dead center and ended at a timing after the compression top dead center. Specifically, the injection timing of the main injection 72 may be set to be such a timing that allows the fuel to ignite in a predetermined retarded period of the expansion stroke. As used herein, the "predetermined retarded period" refers to a combustion period overlapping with a point in time when the pressure rise rate in the cylinder 11 during motoring reaches a negative maximum value.

The main injection 72 is comprised of a predetermined number of (e.g., six in the example illustrated in FIG. 5) fuel injections 90, 90, . . . , in which the lift amount of the fuel injection valve 6 is set to be smaller than that of the preceding injection 71 and in which the fuel injection interval is set to be shorter than that of the preceding injection 71. That is to say, the spray of the fuel injected by the main injection 72 has a smaller particle size and a smaller momentum. In addition, since the interval between the fuel injections is narrow, the recovery of the negative pressure in the vicinity of the injection axis S of the fuel injection valve 6 is slowed down as described above, thus raising the negative pressure in the vicinity of the injection axis S. The spray of the fuel injected by the main injection 72 has a smaller particle size and a smaller momentum, and therefore, is affected by the negative pressure so strongly as to spread less widely radially outward with respect to the injection axis S as a center axis and travel over a relatively short distance. Consequently, as shown in the top drawing of FIG. 7, the spray of the fuel injected by the main injection 72 tends to stay in the radially central region 17a of the combustion chamber 17. As a result, at a point in time when the spray of the fuel injected by the main injection 72 ignites, the concentration of the fuel in the radially central region 17a of the combustion chamber 17 becomes higher than that of the fuel in the radially peripheral region 17b thereof.

The main injection 72 is an injection to produce a main combustion (i.e., combustion that generates the largest quantity of heat in a cycle) that generates an engine torque. Thus, its amount of fuel is set to be an amount appropriately determined with respect to the torque required. For example, in the main injection 72, at least three-quarters of the total amount of the fuel, which is the sum of the amount of the fuel injected by the preceding injection 71 and that of the fuel injected by the main injection 72, is suitably injected.

Next, it will be described how to burn the fuel injected by the preceding injection 71 and main injection 72 described above.

The preceding injection 71 is performed during the compression stroke as shown in the top drawing of FIG. 6. The spray of the fuel injected by the preceding injection 71 travels toward the radially peripheral portion 17b of the combustion chamber 17 as described above. At this time, the temperature in the combustion chamber 17 is a radially uniform, predetermined temperature (of 1000 K, for example) as shown in the bottom graph of FIG. 6.

Thereafter, as the compression stroke proceeds, the air-fuel mixture, including the spray of the fuel injected by the preceding injection 71, has its temperature rising with the compression.

Subsequently, the main injection 72 is started at a predetermined timing before the compression top dead center. The spray of the fuel injected by the main injection 72 goes concentrated toward the radially central region 17a of the combustion chamber 17 as described above (see the top drawing of FIG. 7).

In the meantime, the spray of the fuel injected by the preceding injection 71 stays in the radially peripheral portion 17b. As the in-cylinder temperature rises with the compression stroke, the spray of the fuel will soon cause an oxidation reaction. This oxidation reaction may be caused in the vicinity of the compression top dead center, for example. Nevertheless, since this oxidation reaction is a partial oxidation reaction, the rise in temperature caused by the oxidation reaction is not so significant. In addition, this partial oxidation reaction is caused mainly in the radially peripheral region 17b of the combustion chamber 17. That is why the in-cylinder temperature rises steeply in the radially peripheral region 17b as shown in the bottom graph of FIG. 7. The temperature in the radially peripheral region 17b may rise by several hundred K, for example. In FIG. 7, the two-dot chain indicates the in-cylinder temperature when the preceding injection 71 is performed. In this case, the air-fuel mixture in the radially peripheral region 17b expands through the oxidation reaction, and therefore, the air-fuel mixture or air in the radially central region 17a is subjected to adiabatic compression, and comes to have an increased temperature. The temperature in the radially central region 17a may rise by several ten K, for example.

Note that since the reflux of the EGR gas is stopped in the full-load region, the environment inside the combustion chamber 17 is in a state where the spray of the fuel injected by the preceding injection 71 tends to cause an oxidation reaction relatively easily.

In the meantime, the main injection 72 is carried on while the spray of the fuel injected by the preceding injection 71 is causing the oxidation reaction, and ends at a predetermined timing after the compression top dead center. The spray of the fuel injected by the main injection 72 goes concentrated toward the radially central region 17a of the combustion chamber 17 as shown in the top drawing of FIG. 8. The temperature in the radially central region 17a has been raised through the partial oxidation reaction of the fuel in the radially peripheral region 17b as described above. Thus, even after the expansion stroke has been entered, the temperature in the radially central region 17a is maintained for a while at a temperature at which the fuel can ignite spontaneously. As a result, the spray of the fuel injected by the main injection 72 will ignite spontaneously in a predetermined ignition time delay after the injection has ended. This produces the main combustion, thus making the temperature in the radially central region 17a rise steeply as shown in the bottom graph of FIG. 8. In FIG. 8, the two-dot chain indicates the in-cylinder temperature when the fuel injected by the preceding injection 71 causes an oxidation reaction.

Normally, when the main combustion is retarded, there is a limit to the length of the retardation. That is to say, as the intake stroke proceeds, the in-cylinder temperature falls with an increase in the volume of the combustion chamber 17. That is why excessive retardation of the main combustion would cause an accidental fire. The higher the compression ratio is, the higher the rate of decrease in in-cylinder temperature during the intake stroke is. Thus, the higher the compression ratio is, the shorter the permitted length of the retardation is. However, maintaining the temperature in the radially central region 17a, where the spray of the fuel injected by the main injection 72 is distributed, through the preceding injection 71 even after the compression top dead center allows the permissible length of the retardation of the main combustion to be extended.

Nevertheless, excessively raising the in-cylinder temperature on or after the compression top dead center would allow the fuel injected by the main injection 72 to locally ignite before being completely mixed with the air in the combustion chamber 17, thus possibly producing soot. However, inducing the spray of the fuel injected by the preceding injection 71 to cause the oxidation reaction in a different region from the region where the spray of the fuel injected by the main injection 72 is distributed can reduce an excessive rise in the temperature in the region where the spray of the fuel injected by the main injection 72 is distributed. Consequently, this substantially prevents the fuel injected by the main injection 72 from locally igniting to produce soot.

The combustion period of the main combustion thus retarded (i.e., a period of time in which the fuel has a combustion mass ratio of 10-90%) overlaps with a point in time when the pressure rise rate during motoring reaches a negative maximum value. Alternatively, the center of gravity of the main combustion thus retarded overlaps with a period of time in which the combustion chamber has a significant negative pressure rise rate (e.g., 10 to 20 degrees after the compression top dead center). That is to say, the retarded spontaneous ignition and combustion is produced during a period of time in which the pressure rise rate is inherently low. That is why the maximum value of the pressure rise rate when the combustion is implemented as the retarded spontaneous ignition and combustion has been significantly reduced compared to the maximum value of the pressure rise rate when the combustion is implemented as a normal spontaneous ignition and combustion. As a result, the combustion noise level (i.e., part of noise, vibration and harshness (NVH) level) of the retarded spontaneous ignition and combustion is significantly reduced compared to the combustion noise level of a normal spontaneous ignition and combustion.

Note that to reduce the pressure rise rate during the combustion, the EGR amount may be increased. However, increasing the EGR amount would cause a decrease in the amount of fresh air. As a result, a sufficient torque could not be ensured. The magnitude of the pressure rise rate becomes a problem particularly in a heavy-load operation region, in which a significant torque is required. In contrast, the configuration described above ensures a required volume of fresh air, thus enabling a sufficient torque to be generated.

Referring back to the operation map shown in FIG. 4, the medium-to-heavy load region B is a region in which the load on the engine 1 falls between the light-to-medium load region A and the full load region C. The medium-to-heavy load region B has a smaller amount of fuel injected than the full-load region C. If the fuel is allowed to ignite spontaneously in the medium-to-heavy load region B, there is no need to retard the ignition timing to a predetermined time during the expansion stroke, unlike the full-load region C. Meanwhile, the medium-to-heavy load region B has a larger amount of fuel injected than the light-to-medium load region A. As a result, smoke tends to be produced more easily in the medium-to-heavy load region B than in the light-to-medium load region A. Thus, it is recommended to substantially prevent the fuel concentration from becoming too high by effectively using the air in the combustion chamber.

Figure 9:
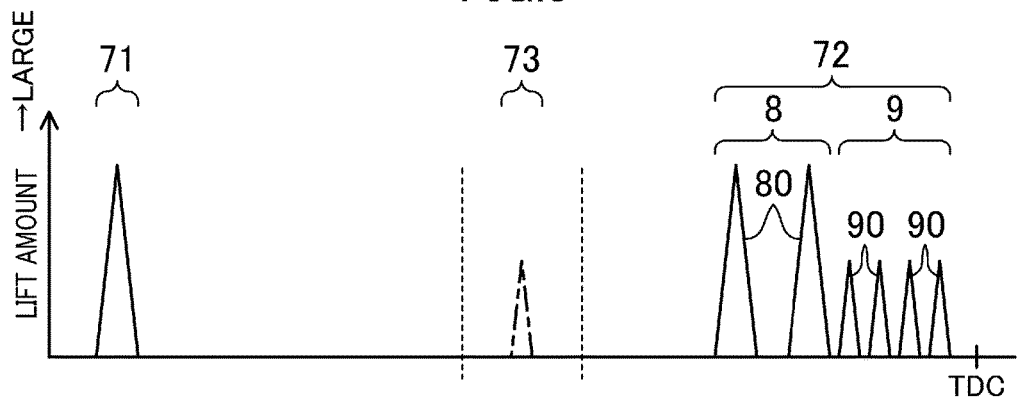
FIG. 9 shows a fuel injection mode in a medium-to-heavy load region.
Figure 10:
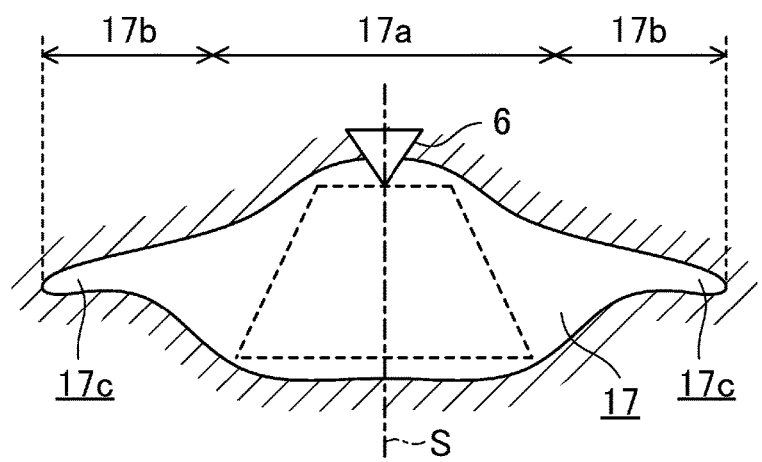
FIG. 10 schematically illustrates an air-fuel mixture layer formed in the combustion chamber in the medium-to-heavy load region.

Thus, in the medium-to-heavy load region B, dispersing the spray of the fuel widely in the combustion chamber while maintaining the adiabatic function of the gas layer described above to a certain degree substantially prevents smoke from being produced. Specifically, as shown in FIG. 9, the fuel is injected twice by the preceding injection 71 and the main injection 72. FIG. 9 shows a fuel injection mode in the medium-to-heavy load region B. FIG. 10 schematically illustrates an air-fuel mixture layer formed in the combustion chamber 17 in the medium-to-heavy load region B.

In the medium-to-heavy load region B, the engine controller 100 makes the EGR system 512 reflux the EGR gas from the exhaust passage 191 into the intake passage 181. In this medium-to-heavy load region B, the EGR gas to be refluxed is an EGR gas that has been cooled by an EGR cooler.

The engine controller 100 performs control such that the excess air factor λ becomes nearly equal to one (i.e., λ≈1) by refluxing the EGR gas in the medium-to-heavy load region B. Adjusting the excess air factor λ to be one enables a three-way catalyst to perform the function of purifying the exhaust gas. Next, the preceding injection 71 and the main injection 72 in the medium-to-heavy load region B will be described in detail.

The preceding injection 71 in the medium-to-heavy load region B is performed before the middle stage of the compression stroke. More specifically, the preceding injection 71 is performed after the intake valve 21 of the engine 1 has been closed during the compression stroke. For example, the preceding injection 71 may be performed at such a timing that allows the fuel injection to end at 120-90 degrees before the compression top dead center. Alternatively, the preceding injection 71 may also be performed over a period ranging from the intake stroke to the first half of the compression stroke.

The preceding injection 71 is performed in a relatively large lift amount. The spray of the fuel injected by the preceding injection 71 has a larger particle size and a greater momentum. Thus, the spray of the fuel injected by the preceding injection 71 travels over a relatively long distance.

In addition, since the preceding injection 71 is performed before the main injection 72, the spray of the fuel injected by the preceding injection 71 reaches the radially (i.e., in the radial direction of the cylinder 11) peripheral region 17b of the combustion chamber 17 when the main injection 72 is performed (see FIG. 10). In the radially peripheral region 17b of the combustion chamber 17, a narrow gap (hereinafter referred to as a "squish area") 17c is left between a circumferential portion of the piston 16 and the ceiling portion of the cylinder 11. At least by the time of ignition, the spray of the fuel injected by the preceding injection 71 has reached the squish area 17c. In other words, the preceding injection 71 is performed at such a timing that allows its spray of the fuel to reach the squish area 17c by the time of ignition.

In this case, if the preceding injection 71 is performed after the intake valve 21 has been closed as described above, the flow of the intake air has already settled to a certain degree, and therefore, the spray of the fuel that has reached the radially peripheral region 17b of the combustion chamber 17 tends to stay there.

Note that the amount of the fuel injected by the preceding injection 71 is smaller than that of the fuel injected by the main injection 72.

The main injection 72 may be performed at such a timing that allows the injection to be completed before compression top dead center, and after the preceding injection 71. The main injection 72 may be performed over a period ranging from the last stage of the compression stroke to the initial stage of the expansion stroke. The main injection 72 is multi-stage injections including a plurality of fuel injections.

Specifically, the main injection 72 includes a first group of injections 8 and a second group of injections 9. The first group of injections 8 is comprised of a predetermined number of (e.g., two in the example illustrated in FIG. 9) fuel injections 80, 80 in which the lift amount of the fuel injection valve 6 is set to be larger than that of the second group of injections 9 and the fuel injection interval is set to be longer than that of the second group of injections 9. The second group of injections 9 is comprised of a predetermined number of (e.g., four in the example illustrated in FIG. 9) fuel injections 90, 90, ..., in which the lift amount of the fuel injection valve 6 is set to be smaller than that of the first group of injections 8 and the fuel injection interval is set to be shorter than that of the first group of injections 8. The lift amount of the first group of injections 8 is approximately the same as that of the preceding injection 71. The lift amount of the second group of injections 9 is smaller than that of the preceding injection 71. Note that the fuel injections 80 shown in FIG. 9 do not necessarily have the same lift amount as the fuel injections 80 shown in FIG. 5. Likewise, the fuel injections 90 shown in FIG. 9 do not necessarily have the same lift amount as the fuel injections 90 shown in FIG. 5, either.

The first group of injections 8 forms a spray of the fuel with a larger particle size and has an expanded negative pressure area as described above, and therefore, forms a spray of the fuel traveling a relatively long distance in the traveling direction and having spread widely in the radial direction. On the other hand, the second group of injections 9 forms a spray of the fuel with a smaller particle size and has a shrunk negative pressure area, and therefore, forms a spray of the fuel traveling a relatively short distance in the traveling direction and having spread narrowly in the radial direction.

As a result of these fuel injections by the first and second groups of injections 8 and 9, at the time of the ignition (i.e., at a predetermined timing after the compression top dead center), the spray of the fuel has already been spread widely to a certain degree in the radial direction inside the combustion chamber 17.

More specifically, a spray of the fuel having a relatively large particle size (i.e., having a greater momentum) is injected at a relatively early timing by the preceding injection 71. Thus, at least at a point in time when the main injection 72 is performed, an air-fuel mixture in which the fuel has a higher concentration in the radially peripheral region 17b than in the radially central region 17a is formed in the combustion chamber 17. In this case, performing the preceding injection 71 as a single-stage injection allows the spray of the fuel to travel over a longer distance compared to performing the preceding injection 71 as multi-stage injections.

Thereafter, a spray of the fuel having a relatively small particle size (i.e., having a smaller momentum) is injected at a relatively late timing by the main injection 72 so as to form an expanded negative pressure region. Thus, at least at a point in time of ignition, an air-fuel mixture in which the fuel has a higher concentration in the radially central region 17a than in the radially peripheral region 17b is formed in the combustion chamber 17. In this case, combining the first group of injections 8 in which the lift amount of the fuel injection valve 6 is set to be relatively large and the fuel injection interval is set to be relatively long with the second group of injections 9 in which the lift amount is set to be relatively small and the fuel injection interval is set to be relatively short forms a spray of the fuel traveling a relatively long distance in the traveling direction and spreading widely in the radial direction and a spray of the fuel traveling a relatively short distance in the traveling direction and spreading narrowly in the radial direction, thus allowing the spray of the fuel to be dispersed widely in the radially central region 17a of the combustion chamber 17.

Note that the spray of the fuel injected by the first group of injections 8 just travels a longer distance, and radially spreads more widely, than the spray of the fuel injected by the second group of injections 9. Thus, the spray of the fuel injected by the first group of injections 8 travels a shorter distance, and radially spreads less widely, than the spray of the fuel injected by the preceding injection 71.

As described above, the preceding injection 71 has the spray of the fuel distributed in a larger amount in the radially peripheral region 17b of the combustion chamber 17 than in the radially central region 17a thereof. On the other hand, the main injection 72 has the spray of the fuel distributed in a larger amount in the radially central region 17a of the combustion chamber 17 than in the radially peripheral region 17b thereof. These preceding and main injections 71, 72 form an air-fuel mixture that is radially widely dispersed in the combustion chamber 17 at the time of the ignition. That is to say, these preceding and main injections 71, 72 substantially prevent any portion with a locally high fuel concentration from being formed.

Then, after the preceding injection 71 and the main injection 72 are completed, the fuel will ignite. That is to say, after an air-fuel mixture has been formed to be radially widely dispersed in the combustion chamber 17, the spray of the fuel will ignite. Thus, this substantially prevents smoke from being produced.

In this case, the preceding injection 71 is performed relatively early, but the amount of the fuel injected by the preceding injection 71 is smaller than the amount of the fuel injected by the main injection 72 and is not so large, thus allowing for avoiding precocious ignition. In addition, in this operation region, the EGR gas is present as an inert gas in the combustion chamber 17. This also substantially prevents the preceding injection 71 from igniting the spray of the fuel precociously.

(Fuel Injection Control in Medium-To-Heavy Load Region)

In the medium-to-heavy load region B, the fuel is basically injected twice by the preceding injection 71 and the main injection 72, as described above. In this case, depending on the pressure state in the cylinder 11, the temperature state in the cylinder 11, and the oxygen concentration in the cylinder 11, the fuel injected into the cylinder 11 by the preceding injection 71 may cause a partial oxidation reaction during the second half of the compression stroke. Once the partial oxidation reaction has been caused, the temperature in the cylinder 11 rises accordingly. Thus, the fuel injected by the main injection 72 will ignite spontaneously before being granted a sufficient ignition time delay, thus either producing smoke or prolonging the combustion period during the expansion stroke to increase the CO emission.

Figure 11:
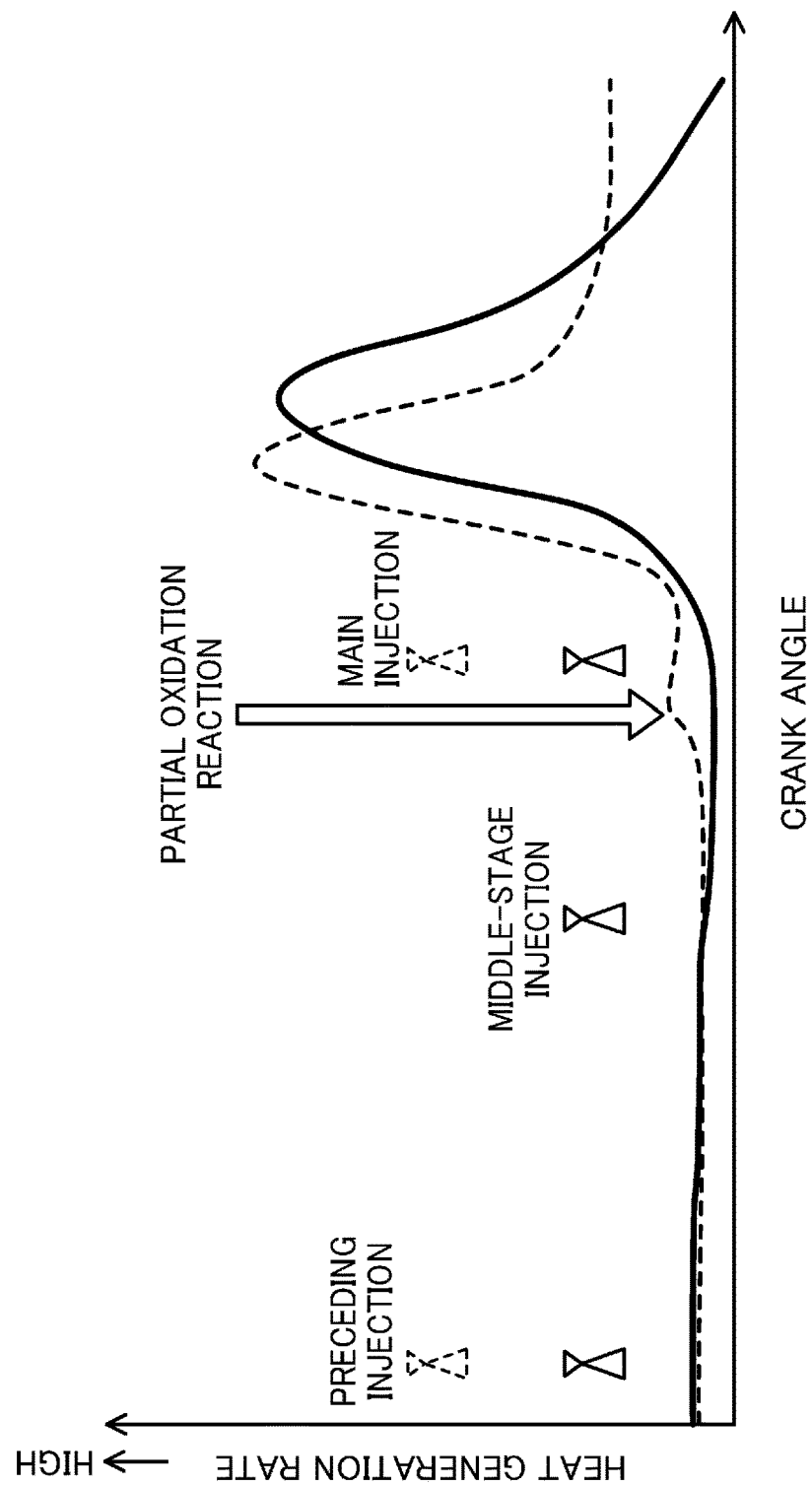
FIG. 11 shows how the heat generation rate changes depending on whether a middle-stage injection is performed or not.

FIG. 11 shows an exemplary variation in heat generation rate in the cylinder 11 in the medium-to-heavy load region B. FIG. 12 shows an exemplary variation in average temperature in the cylinder 11 in the medium-to-heavy load region B. In FIGS. 11 and 12, the dashed curve indicates a situation where the fuel is injected twice by the preceding injection 71 and the main injection 72, showing an example in which the fuel injected by the preceding injection 71 causes a partial oxidation reaction during the second half of the compression stroke. As shown in FIG. 11, the generation of the partial oxidation reaction leads to generation of heat, albeit only a small quantity. In addition, as shown in FIG. 12, the temperature in the cylinder 11 also rises.

Performing the main injection 72 in such a state allows the fuel injected by the main injection 72 to ignite spontaneously in the vicinity of the compression top dead center without being granted a sufficient ignition time delay. Mixing the fuel and the air insufficiently leads to producing smoke. In addition, insufficiently mixing the fuel and the air allows the heat to be continuously generated even during the second half of the combustion, thus causing an increase in CO emission.

Thus, in this engine 1, the engine controller 100 determines whether or not a partial oxidation reaction is going to occur during the second half of the compression stroke. If the answer is YES, the engine controller 100 performs a middle-stage injection 73 between the preceding injection 71 and the main injection 72 as indicated by the phantom line in FIG. 9. The latent heat of vaporization of the spray of the fuel injected into the cylinder 11 by the middle-stage injection 73 causes a fall in the temperature in the cylinder 11, thus suppressing the occurrence of the partial oxidation reaction.

The engine controller 100 estimates, based on the cooling water temperature detected by the water temperature sensor 58 and the intake air temperature detected by the intake air temperature sensor 59, the temperature state in the cylinder 11. The engine controller 100 also estimates, based on the intake air pressure detected by the intake air pressure sensor 510, the pressure state in the cylinder 11. The engine controller 100 further estimates, based on the concentration of oxygen in the exhaust gas detected by the linear $O_2$ sensor 511, the concentration of the oxygen in the cylinder 11, thus determining whether or not a partial oxidation reaction is going to occur during the second half of the compression stroke. For example, the engine controller 100 may determine in advance, based on a preset model and the respective parameters described above, for example, whether or not a partial oxidation reaction is going to occur. Alternatively, the engine controller 100 may also determine a posteriori, based on the components of the exhaust gas, that the partial oxidation reaction has occurred.

The middle-stage injection 73 is performed during a predetermined period between the preceding injection 71 and the main injection 72 as indicated by the dotted lines in FIG. 9. The middle-stage injection 73 is a single-stage fuel injection. The middle-stage injection 73 is performed before the partial oxidation reaction occurs during the second half of the compression stroke. As described above, the middle-stage injection 73 is suitably performed just before the partial oxidation reaction occurs in order to prevent the partial oxidation reaction from occurring by lowering the temperature in the cylinder 11 with the latent heat of vaporization of the fuel injected.

Performing the middle-stage injection 73 too early would lower the temperature in the cylinder 11 with the latent heat of vaporization before a period when the partial oxidation reaction will occur. In that case, the function of preventing the occurrence of the partial oxidation reaction would not be performed sufficiently. In addition, the fuel injected by the middle-stage injection would also be exposed to the high-temperature, high-pressure environment in the cylinder 11, thus possibly causing the partial oxidation reaction during the second half of the compression stroke. Thus, the middle-stage injection 73 is suitably performed at such a timing that allows the fuel injected by the middle-stage injection 73 to ignite spontaneously on or after the fuel injected by the main injection 72 has ignited spontaneously.

This gives the middle-stage injection 73 a relatively long interval between itself 73 and the main injection 72 that follows it. Specifically, the interval between the end of injection of the middle-stage injection 73 and the start of injection of the main injection 72 is longer than the interval between the first and second injections of the main injection 72 that is multi-stage injections. This substantially prevents the spray of the fuel injected by the middle-stage injection 73 from overlapping with the spray of the fuel injected by the main injection 72. This is beneficial in cutting down the cooling loss by lowering the combustion temperature and substantially preventing smoke from being produced by eliminating a local formation of an excessively dense air-fuel mixture.

The amount of the fuel injected by the middle-stage injection 73 is smaller than that of the fuel injected by the main injection 72. Since the middle-stage injection 73 starts at an earlier injection timing than the main injection 72, the pressure and temperature in the cylinder 11 are not sufficiently high yet at the injection timing of the middle-stage injection 73. Thus, as the amount of the fuel injected by the middle-stage injection 73 increases, the spray of the fuel injected into the cylinder 11 is more and more likely to travel longer than expected, and eventually contact with the wall surface of the combustion chamber 17. This is disadvantageous in forming a gas layer around the air-fuel mixture layer. For that reason, the amount of the fuel injected by the middle-stage injection 73 is suitably relatively small. In addition, decreasing the amount of the fuel injected by the middle-stage injection 73 allows a lot of fuel to be injected by the main injection 72. This contributes advantageously to increasing the engine torque in the medium-to-heavy load region B.

In FIGS. 11 and 12, the solid curve indicates an exemplary variation in heat generation rate and an exemplary variation in average temperature in the cylinder 11, respectively, in a situation where the preceding injection 71, the middle-stage injection 73, and the main injection 72 are performed. As described above, performing the middle-stage injection 73 at a predetermined timing allows the temperature in the cylinder 11 to be lowered as shown in FIG. 12, thus substantially preventing the partial oxidation reaction from occurring (see FIG. 11). The fuel injected by the main injection 72 is allowed to ignite spontaneously with a sufficient ignition time delay granted. In FIG. 11, the peak of the heat generation involved with the spontaneous ignition as indicated by the solid curve is retarded with respect to the peak of the heat generation as indicated by the dashed curve, thus substantially preventing smoke from being produced. In addition, the combustion quickly ends during the second half of the combustion. This allows the CO emission to be reduced. In this manner, the partial oxidation reaction is utilized intentionally in the full-load region C, while the partial oxidation reaction is substantially prevented from occurring in the medium-to-heavy load region B.

Note that in the examples shown in FIGS. 5 and 9, the preceding injection 71 and the main injection 72 are each implemented as multi-stage injections comprised of a plurality of fuel injections. Alternatively, the fuel injection may also be performed continuously with the lift amount of the fuel injection valve 6 maintained at a constant lift amount for a predetermined amount of time. Even in that case, the spray of the fuel can also be formed in the same way as in the multi-stage injections.

In the example described above, an outwardly-opening fuel injection valve is adopted as the fuel injection valve 6. However, the fuel injection valve 6 applicable for use in the present disclosure does not have to be such an outwardly-opening fuel injection valve. For example, a valve covered orifice (VCO) nozzle type injector can also change the effective cross-sectional area of the injection nozzle orifice by adjusting the degree of cavitation produced at the nozzle orifice. Consequently, even if the fuel injection mode shown in FIG. 5 or 9 is adopted, an air-fuel mixture layer can also be formed in the central region of the cavity 163, a heat-insulating gas layer may be formed around the air-fuel mixture layer, and an excessively dense air-fuel mixture can also be prevented from being formed locally in the same way as in the outwardly-opening fuel injection valve.

In the example described above, a heat shield structure is adopted for the combustion chamber and the intake port and a heat-insulating gas layer is formed inside the combustion chamber. However, the present disclosure is also applicable to an engine that does not adopt such a heat shield structure.

DESCRIPTION OF REFERENCE CHARACTERS

1 Engine (Engine Body)
100 Engine Controller (Fuel Injection Control Unit)
11 Cylinder
12 Cylinder Block
13 Cylinder Head
16 Piston
17 Combustion Chamber
6 Fuel Injection Valve

The invention claimed is:

1. A fuel injection control device for a direct-injection engine, the control device comprising:
   an engine body including a combustion chamber defined by a cylinder head ceiling portion, a cylinder provided for a cylinder block, and a piston reciprocating inside the cylinder; and
   a fuel injection control unit which includes a fuel injection valve, provided inside the combustion chamber to inject a liquid fuel, and which is configured to inject the fuel into the combustion chamber at a predetermined timing, wherein
   the fuel injection control unit performs a main injection over a period ranging from a last stage of a compression stroke to an initial stage of an expansion stroke, and also performs a preceding injection, injecting a smaller amount of the fuel than the main injection, over a period ranging from an intake stroke to a first half of the compression stroke, and
   the fuel injection control unit also determines whether or not the fuel injected by the preceding injection causes a partial oxidation reaction during a second half of the compression stroke, and on determining that the fuel causes the partial oxidation reaction, performs a middle-stage injection between the preceding injection and the main injection, and
   the fuel injection control unit performs the middle-stage injection at such a timing that allows the fuel injected by the middle-stage injection to ignite spontaneously on or after the fuel injected by the main injection has spontaneously ignited and before the partial oxidation reaction occurs during the second half of the compression stroke.

2. The fuel injection control device for the direct-injection engine of claim 1, wherein
   the fuel injection control unit determines, based on a pressure in the cylinder, a temperature in the cylinder, and an oxygen concentration in the cylinder, whether or not the partial oxidation reaction is going to occur.

3. The fuel injection control device for the direct-injection engine of claim 1, wherein
   the middle-stage injection injects a smaller amount of the fuel than the main injection.

4. The fuel injection control device for the direct-injection engine of claim 1, wherein
   the main injection is multi-stage injections including a plurality of fuel injections,
   an interval between an end of injection of the middle-stage injection and a start of injection of the main injection is longer than an interval between first and second injections of the main injection.

5. The fuel injection control device for the direct-injection engine of claim 2, wherein
   the middle-stage injection injects a smaller amount of the fuel than the main injection.

6. The fuel injection control device for the direct-injection engine of claim 2, wherein
   the main injection is multi-stage injections including a plurality of fuel injections,
   an interval between an end of injection of the middle-stage injection and a start of injection of the main injection is longer than an interval between first and second injections of the main injection.

7. The fuel injection control device for the direct-injection engine of claim 3, wherein
   the main injection is multi-stage injections including a plurality of fuel injections,
   an interval between an end of injection of the middle-stage injection and a start of injection of the main injection is longer than an interval between first and second injections of the main injection.

* * * * *